United States Patent

Oyanagi et al.

[11] Patent Number: 5,999,617
[45] Date of Patent: Dec. 7, 1999

[54] DIALING CONTROL METHOD

[75] Inventors: Shigeru Oyanagi, Yokohama; Akihiko Nakase, Tokyo; Mitsuru Kakimoto, Kawasaki, all of Japan

[73] Assignee: Kabushiki Kaisha Toshiba, Kawasaki, Japan

[21] Appl. No.: 08/816,594

[22] Filed: Mar. 13, 1997

[30] Foreign Application Priority Data

Mar. 15, 1996 [JP] Japan .................................. 8-059809

[51] Int. Cl.⁶ ...................................................... H04M 3/00
[52] U.S. Cl. ........................... 379/265; 379/266; 379/201
[58] Field of Search .................................. 379/265, 266, 379/309, 216, 201

[56] References Cited

U.S. PATENT DOCUMENTS

| | | |
|---|---|---|
| 4,829,563 | 5/1989 | Crockett et al. . |
| 4,881,261 | 11/1989 | Oliphant et al. . |
| 5,247,569 | 9/1993 | Cave .................................. 379/266 X |
| 5,327,490 | 7/1994 | Cave .................................. 379/266 X |
| 5,327,491 | 7/1994 | Syu . |
| 5,341,412 | 8/1994 | Ramot et al. ...................... 379/265 X |

Primary Examiner—Creighton Smith
Attorney, Agent, or Firm—Oblon, Spivak, McClelland, Maier & Neustadt, P.C.

[57] ABSTRACT

This invention relates to a dialing control method in a system, which comprises a PBX, a plurality of telephones connected to the PBX, a host computer connected to the PBX, and a plurality of operator terminals connected to the host computer, and in which an outbound task program runs on each terminal, and the host computer predicts a conversation completion timing of each operator for one called party, performs automatic dialing in accordance with a called party list prior to the completion of the conversation, and connects an answered call to the telephone corresponding to a free operator. The conversation completion timing is detected in advance by detecting execution of a specific portion of the program on the operator terminal, and the number of calls to be automatically originated is determined on the basis of the number of operators, whose conversation completion timings are detected in advance.

1 Claim, 16 Drawing Sheets

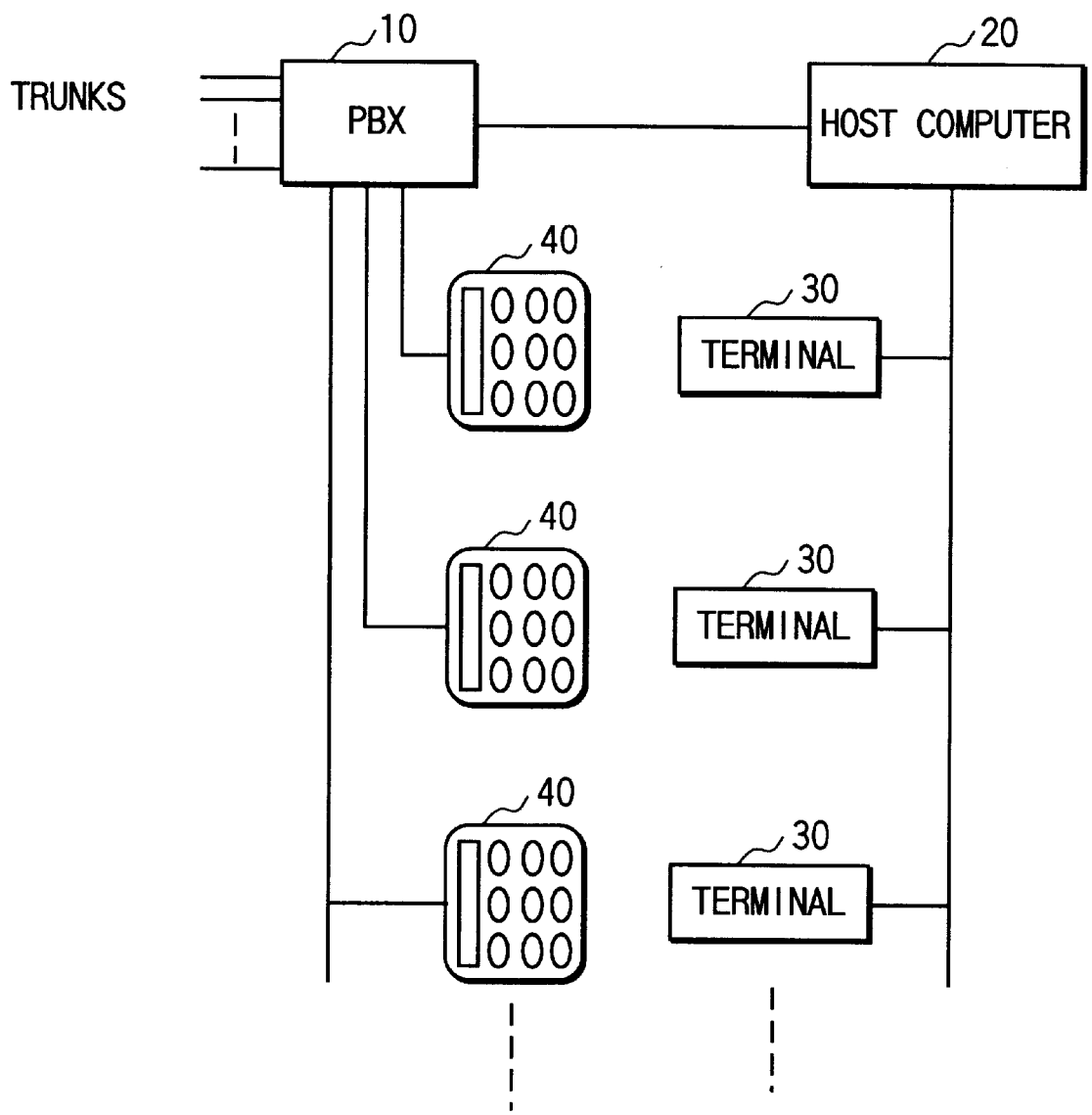
F I G. 1

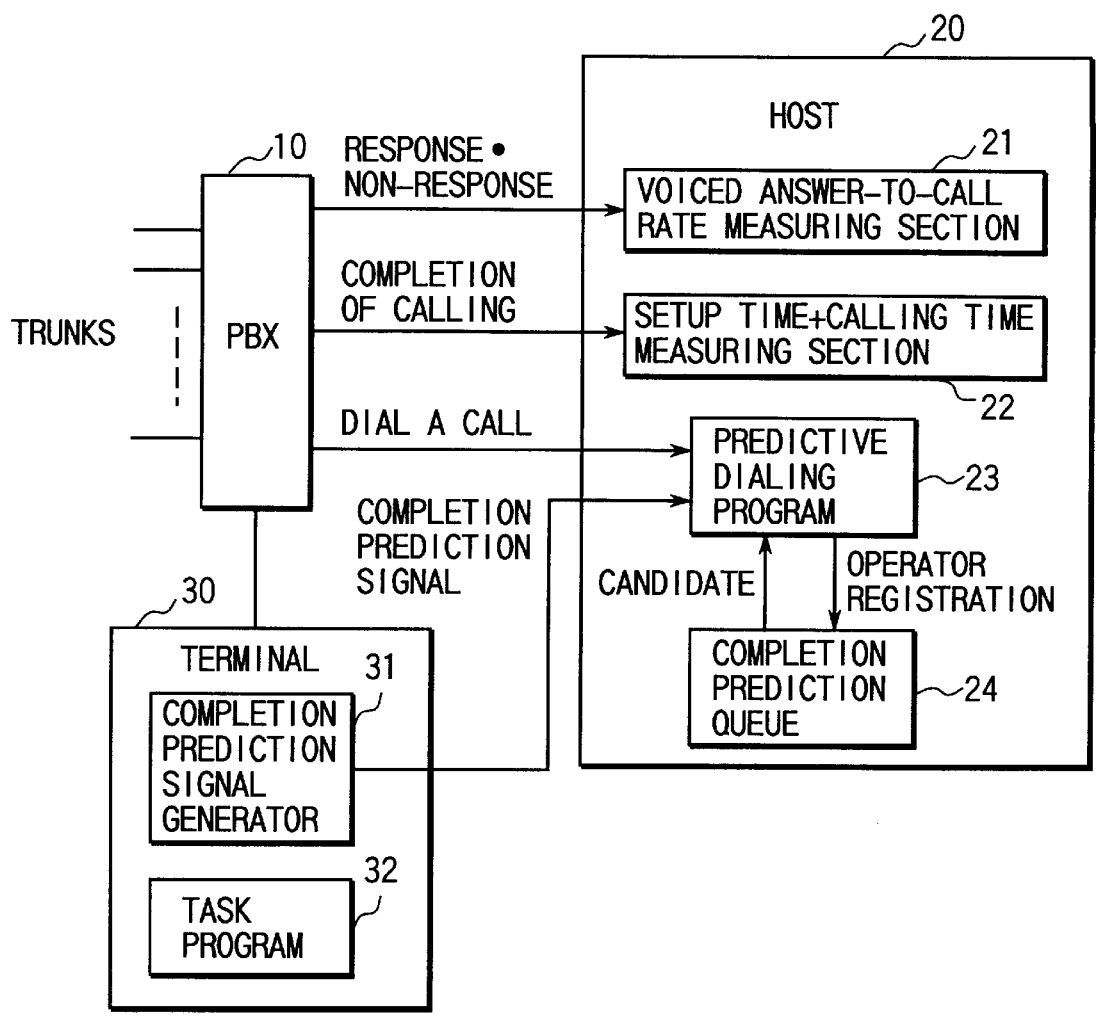
F I G. 2
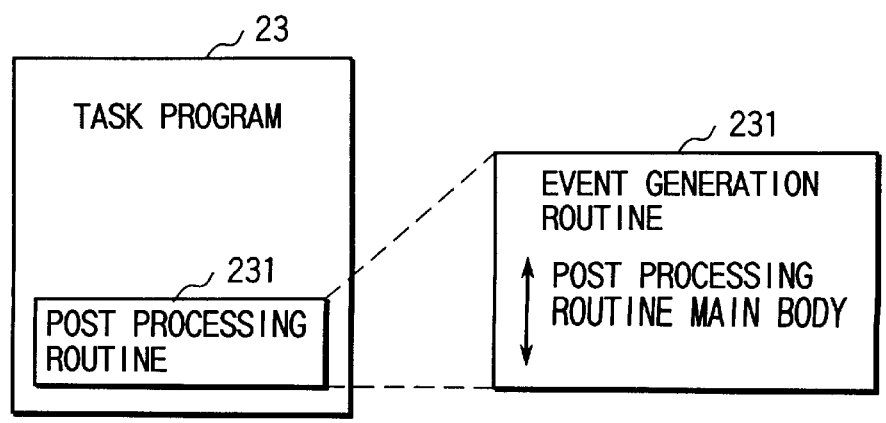
F I G. 3

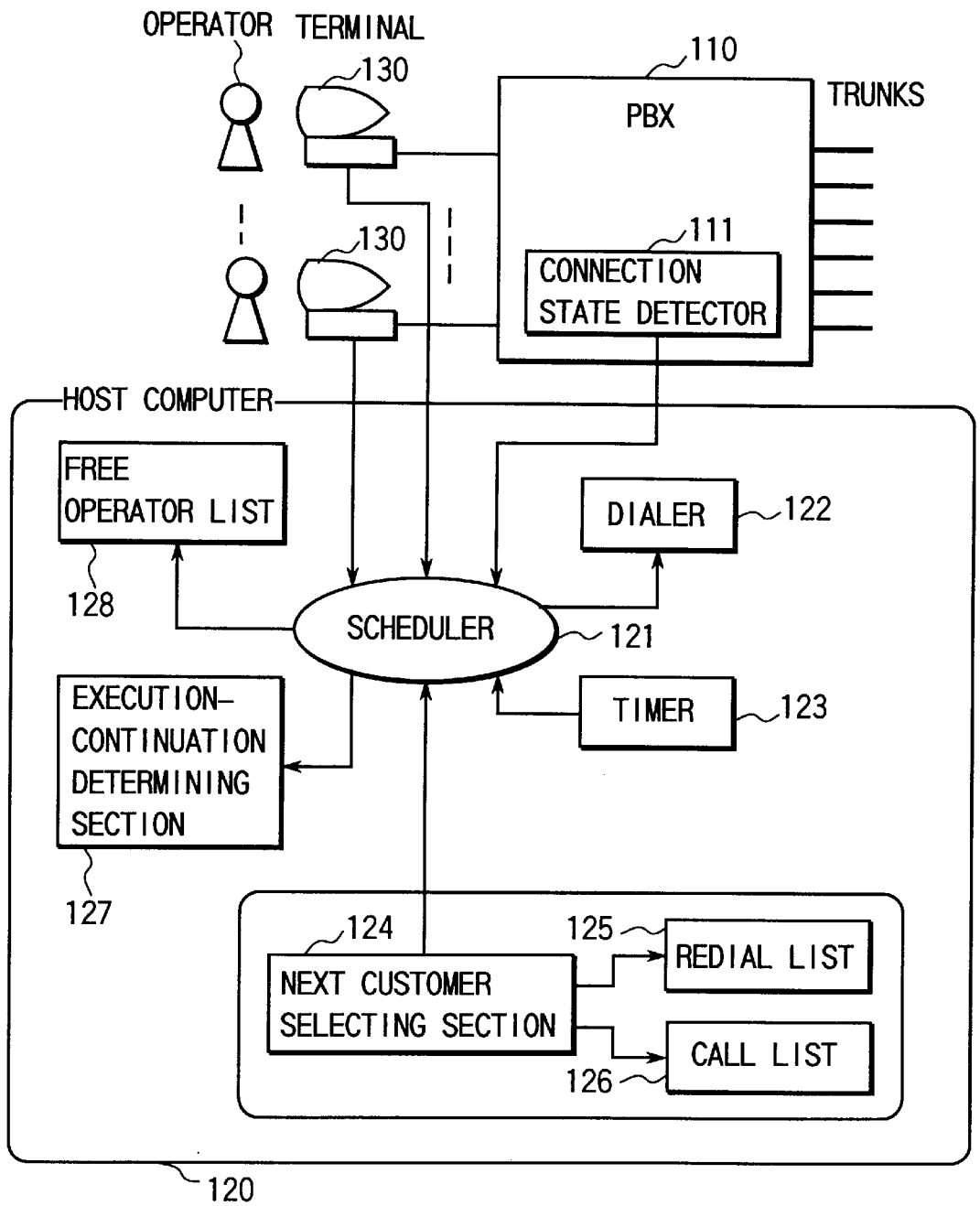
F I G. 6

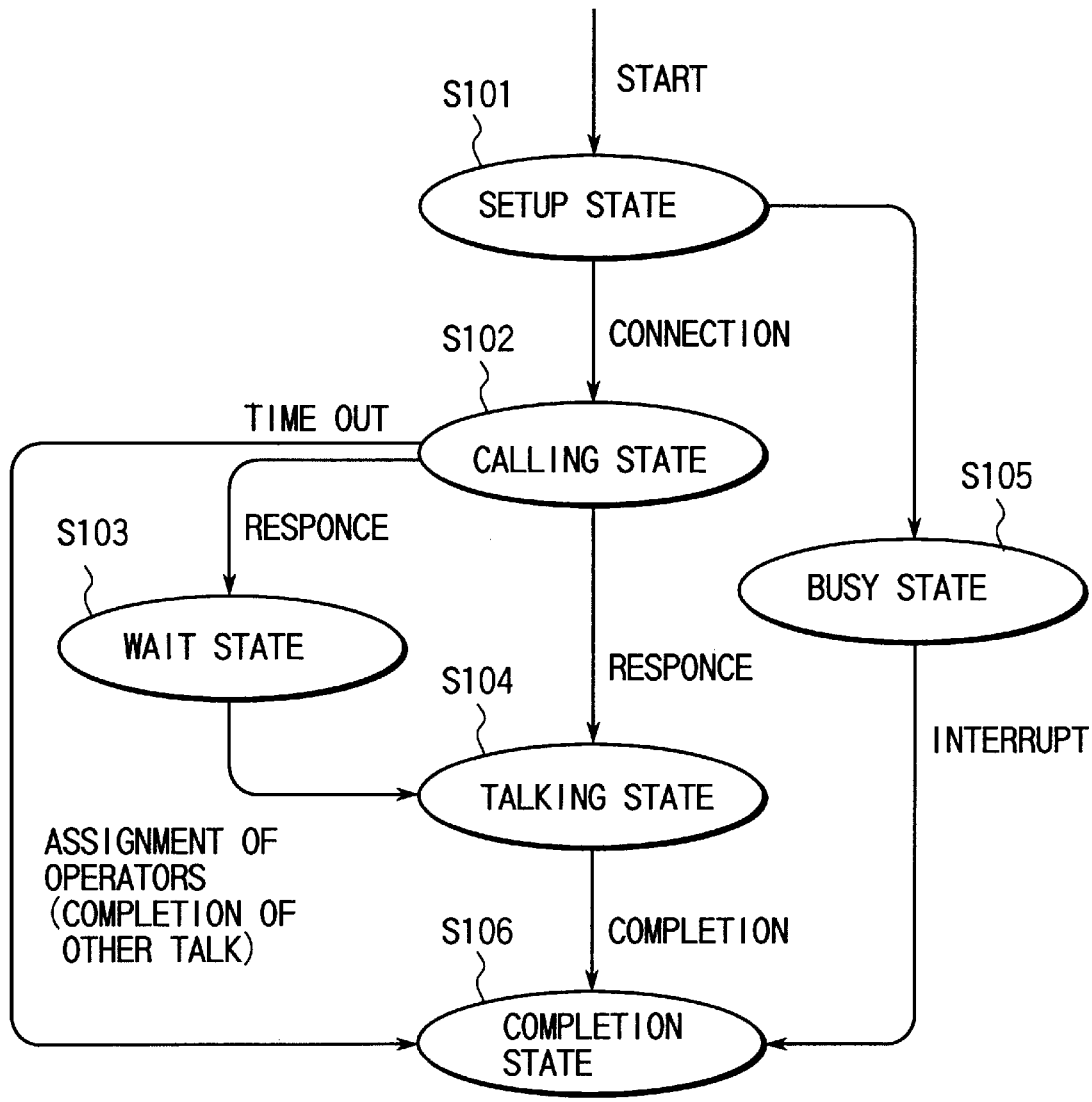
F I G. 7

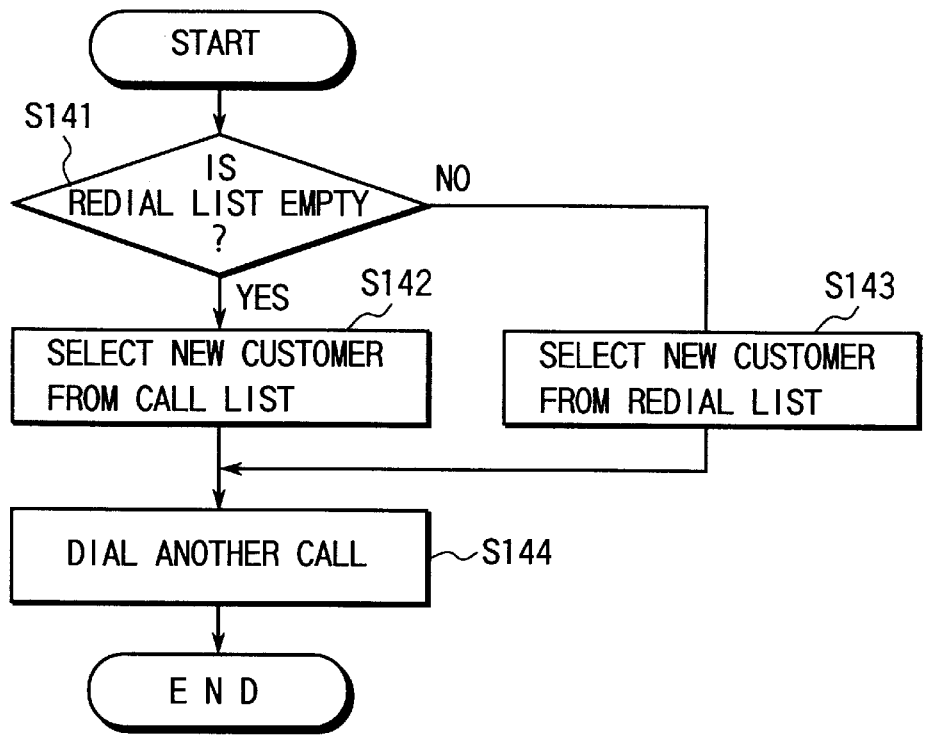
F I G. 1 3
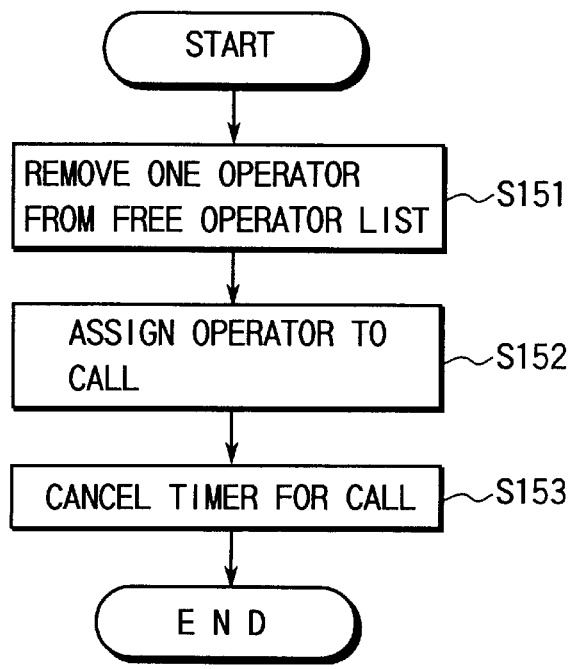
F I G. 1 4

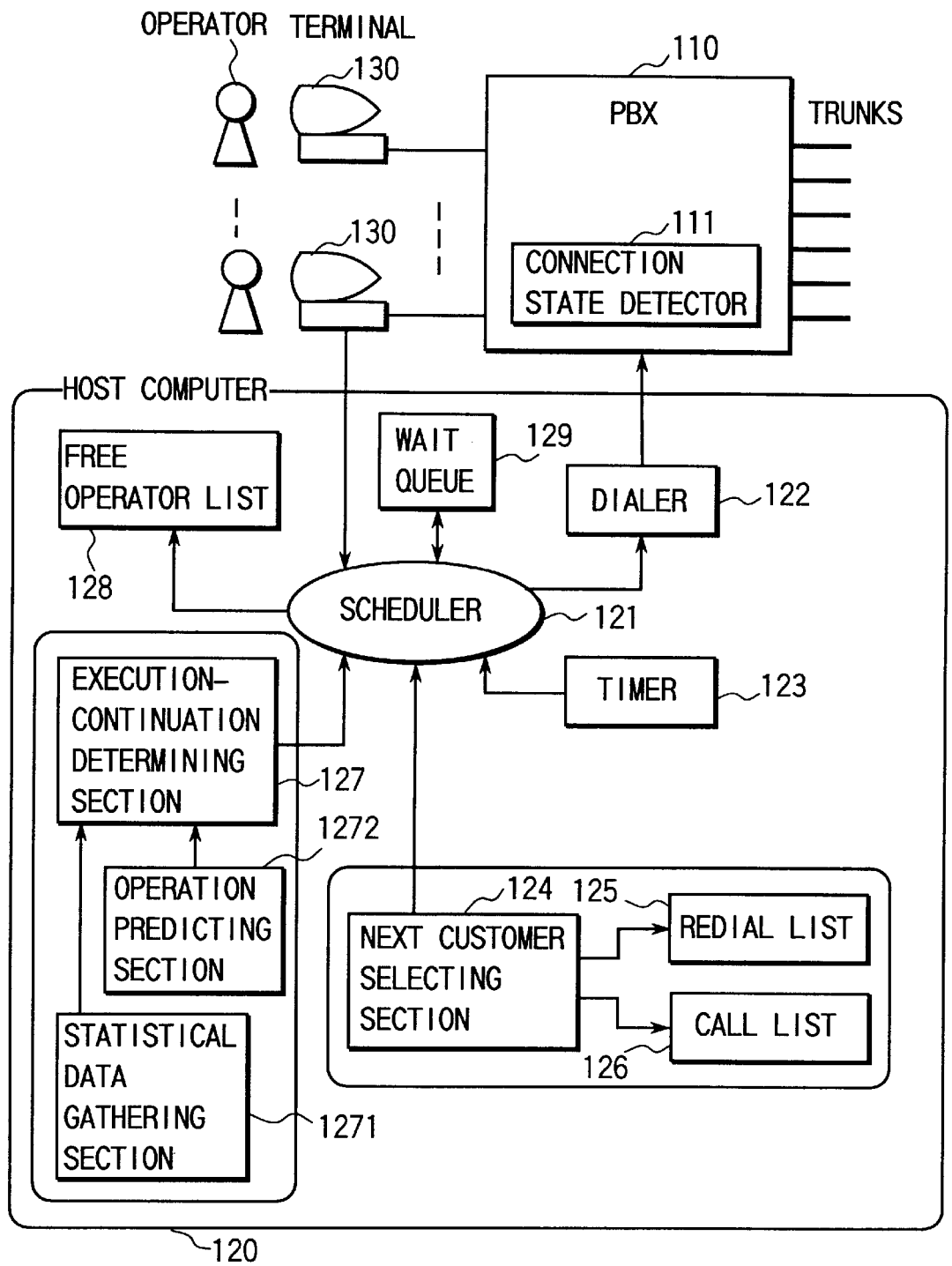
F I G. 17

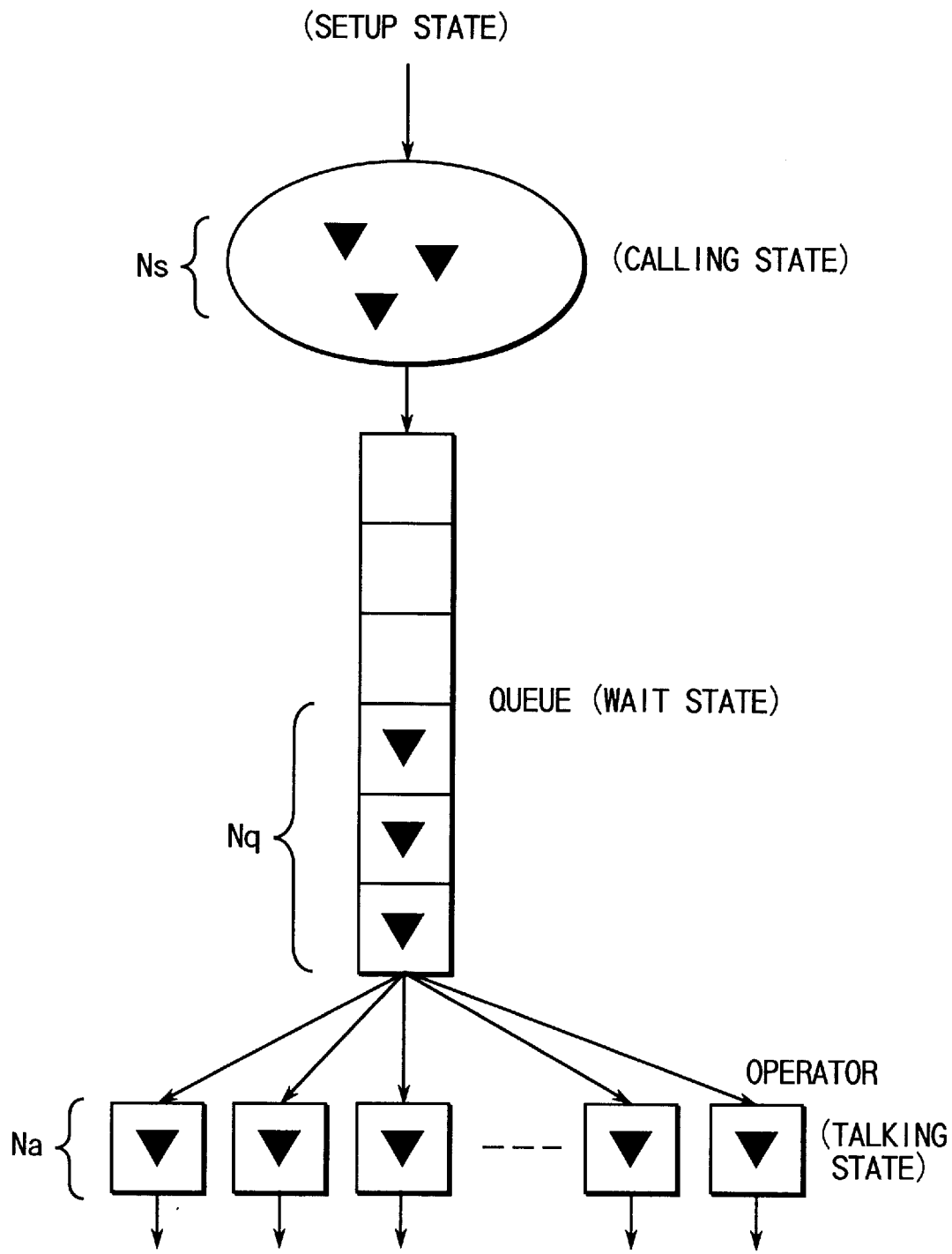
F I G. 18

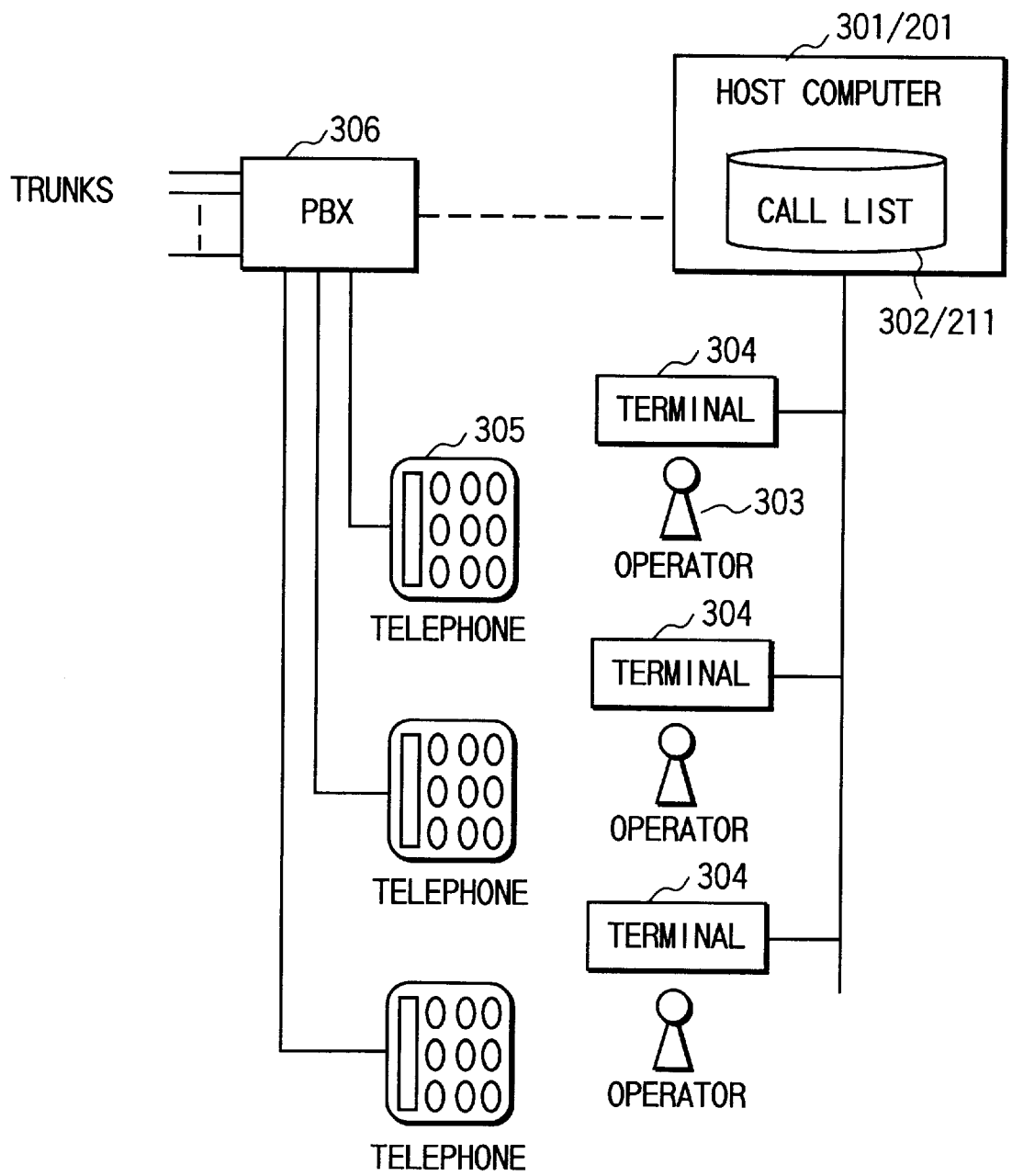
F I G. 19

| CUSTOMER NAME | TELEPHONE NUMBER | PERSONAL DATA |
|---|---|---|
| A | 111-2222 | --- |
| B | 111-3333 | --- |
| C | 111-4444 | --- |
| D | 111-5555 | --- |

FIG. 21

| SITUATION | CUSTOMER NAME | TELEPHONE NUMBER | TIME |
|---|---|---|---|
| ABSENCE | B | 111-3333 | ○○(HOUR)××(MINUTE) |

FIG. 22

| CUSTOMER NAME | TELEPHONE NUMBER | PERSONAL DATA |
|---|---|---|
| X | 222-1111 | --- |
| B | 111-3333 | --- |
| Y | 333-4444 | --- |
| Z | 444-5555 | --- |

FIG. 23

DIALING CONTROL METHOD

BACKGROUND OF THE INVENTION

The present invention relates to a dialing control method in a call center that executes the outbound task by connecting telephones and a computer.

In recent years, telemarketing that performs sales activities via telephones has received a lot of attention. A system in which a list of customers is held on a computer, and a large number of operators make telephone calls to customers while observing the list of customers so as to provide telemarketing services is called a call center, and has an arrangement, as shown in, e.g., FIG. 19. Referring to FIG. 19, a host computer 301 holds a call list 302, which is displayed on terminals 304 of operators 303. Each operator 303 makes telephone calls to customers listed in the call list using a telephone 305 to provide tele-marketing services. In a system in which a host computer links with a PBX, dialing is automatically made via a PBX 306 in accordance with an instruction from the terminal 304 to connect the corresponding telephone 305.

In tele-marketing, since the operators directly talk to individual customers using the telephones to provide data about products or persuade while observing the customers' responses, such sales activities can be attained with low cost. However, in a large-scale system, a large number of operators and a large number of telephone lines are required, and a method of efficiently controlling telephone dialing is required to talk to customers as many as possible within a predetermined period of time.

A task for dialing from the center to a customer of those of the call center is generally called an outbound task. For example, the sales activities for taking orders via telephones while listing up good customers, the questionnairing for predicting a successful candidate by asking voters about candidates they will vote in the election, and the like correspond to the outbound task.

In an outbound task, calls must be made for a large number of customers (or voters). For this reason, a system of efficiently taking operators into their services is desired.

In a certain conventional tele-marketing system, operators are individually given a customer list, and manually make calls based on the list. For this reason, when a customer is absent or busy, the operator must wait, thus impairing the operator efficiency.

In view of this problem, a system of performing automatic dialing using a computer has been proposed.

As a preferred system, a host computer monitors the states of lines, detects completion of conversation between an operator and a customer, selects another appropriate customer from the call list, and automatically makes a call to the selected customer. This system is called a power dialing system. In this system, since dialing is automated, the operator efficiency can be improved as compared to the above-mentioned system. However, in this system as well, the idle time for an operator is produced from when dialing is started until the call is connected and the called customer answers the telephone call.

More specifically, upon dialing, the call is not immediately connected to the customer. An operation for connecting the line on the public network (this operation is called a setup operation, and the time required for this operation is called a setup time) is required. Furthermore, even when the line is connected, if the called customer is busy, the call must be interrupted, and redialing must be done. Even when the customer is not busy and the ringing tone is produced, a certain time is required until the customer answers (this time is called a calling time). When the called customer does not answer after an elapse of a sufficient period of time from the beginning of calling, it is determined that the customer is absent, and dialing must be done for another customer. These times amount for the idle time of the operator. Accordingly, the power dialing system cannot often obtain sufficiently high efficiency although it depends on situations.

In order to solve this problem, dialing to the next customer is performed using another line before the conversation time between the operator and the customer is completed, whether the customer is absent or busy is automatically determined, and the connected customer is automatically distributed to an operator, thereby improving the operator efficiency. Such a system is called a predictive dialing system. The predictive dialing system is disclosed in detail in, e.g., U.S. Pat. Nos. 4,829,563 and 5,327,491.

In order to reduce the idle time, dialing must be performed while predicting the connection timing of the next call so that the next call is connected just at the talk-completion timing between the operator and the customer. In this case, calls more than the number of operators are originated under the assumption that several % of customers are absent or busy. Such a dialing system is called a predictive dialing system.

However, whether or not the predicted result comes true is the matter of probability, and if there is no free operator even though the call is connected and a customer answers, the customer must wait at the telephone. In this case, an urgent countermeasure may be taken, e.g., a message or music recorded on a tape may be played back. However, although such a telephone call is one-sidedly made, the message played back from the tape may wound customer's susceptibilities, and this may result in a reverse effect on the business. In general, prediction is made in consideration of the setup time, calling time, conversation time (the time required for the operator to talk with one customer), and the like. However, since these times do not have definite values, prediction errors occur. Also, whether the customer is busy or absent cannot be predicted in advance, and may cause prediction errors. Since predictive dialing is made, the possibility of such cases cannot be reduced to be zero, but occurrence of the wait state must be suppressed and the wait time must be shortened as much as possible.

However, in the conventional predictive dialing system, since the conversation time of each operator is indefinite, the completion of conversation is predicted using the average conversation time or the like. For this reason, when the conversation time is considerably longer than the average time, no operator can cope with a call which has been originated upon predicting the completion of conversation, and the customer must wait. On the other hand, when the wait state is to be eliminated, the operator efficiency is impaired.

In the case of power dialing, the setup time is directly added to the operator's idle time, and redialing due to a busy customer also prolongs the operator's idle time. In the case of predictive dialing, a response to the started call cannot be definitely predicted due to an indefinite setup time and the presence of busy customers, thus causing the operator's idle time or customer's wait time.

In the future, as portable telephones become popular, the rate of absence lowers and the calling time becomes shorter, but the setup time is expected to become longer. In this way, the setup time may disturb improvement of the service efficiency of operators.

As described above, when the setup time and the busy rate can be substantially decreased, the problems of the above-mentioned systems can be solved, and the service efficiency of operators can be improved.

In tele-marketing, when a customer is absent or busy, dialing must be interrupted, and redialing must be made later for such customers. In particular, when a customer is absent, the operator must hear the calling tones of a telephone for a predetermined period of time so as to detect whether or not the customer is absent, resulting in a serious bottleneck in terms of the efficiency of tele-marketing.

In a call center that adopts the above-mentioned power or predictive dialing system, the host computer 301 performs automatic dialing, and connects the line, the customer answers, to the telephone 305 of an operator. In such case as well, the presence of absent or busy customers disturbs an improvement of the efficiency of telemarketing.

As described above, (1) in the predictive dialing system such as a conventional telemarketing system, in which the call center for performing the outbound task, since it is difficult to accurately predict completion of conversation of an operator, it is difficult to attain improvement of the operator efficiency and suppression of occurrence of the wait state of the customer for the connected call (or shortening the generated wait time) at the same time.

(2) In the power dialing system in which the conventional call center for performing the outbound task performs automatic dialing, since the setup time is added to the operator's idle time, and the time required for redialing to a busy customer is also added to the operator's idle time, it is difficult to sufficiently improve the operator efficiency.

In the predictive dialing system in which the conventional call center for performing the outbound task performs automatic dialing, it is difficult to accurately predict the setup time and the busy rate, it is difficult to attain improvement of the operator efficiency and suppression of occurrence of the wait state of the customer for the connected call (or shortening the generated wait time) at the same time.

(3) In various other systems in which the conventional call center for performing the outbound task performs manual or automatic dialing, when the called customer is absent or busy, the operator's idle time increases, thus impairing the operator efficiency.

BRIEF SUMMARY OF THE INVENTION

It is an object of the present invention to provide a dialing control method which can improve the operator efficiency and can eliminate the wait state of a customer for the connected call at the same time in an outbound task processing system.

It is another object of the present invention to provide a dialing control method which can improve the operator efficiency by substantially decreasing the setup time and the busy rate in an outbound task processing system.

It is still another object of the present invention to provide a dialing control method which can improve the operator efficiency and can eliminate the wait state of a customer for the connected call at the same time by substantially decreasing the setup time and the busy rate in an outbound task processing system.

It is still another object of the present invention to provide a method of pacing a call in a call origination management system having a plurality of operators to which answered calls are connected, comprising the steps of: detecting a service completion timing in advance by detecting execution of a specific portion of a program which runs on a terminal operated by the operator; and automatically originating a call in response to the detection.

Preferably, when detecting the conversation completion timing in advance, execution of a specific portion in a terminal program to be executed when a specific operation is performed at the operator station is detected.

The specific portion of the programs is preferably, e.g., a portion executed prior to the conversation completion.

According to the present invention, the terminal at which an operator performs a calling task detects that the program executes a specific portion, and the conversation completion time of the operator from the detection timing can be predicted with high precision. Based on the predicted completion time, the number of calls to be automatically originated can be computed with high precision. Hence, an accurate predictive dialing system can be realized. That is, the operator efficiency can be improved while occurrence of the wait state of a called party (i.e., customer) for the connected call can be suppressed, or the generated wait time can be shortened.

According to the second aspect of the present invention, a method of pacing a call in a call origination management system having a plurality of operators to which answered calls are connected, comprising the steps of: holding a predetermined number of calls in a setup state by repeating call origination and interruption in accordance with a called party list which registers data of called parties; changing a state of a call in the setup state to a calling state so that a sum of the number of calls in the calling state and the number of calls in a busy state equals a predetermined value larger than the number of all the operator stations; and connecting a call, the state of which has changed to the calling state and to which a called party answers within a predetermined period of time, to a free operator in accordance with an operator list which registers free operators.

According to the third aspect of the present invention, a method of pacing a call in a call origination management system having a plurality of operators to which answered calls are connected, comprising the steps of: holding a predetermined number of calls in a setup state by repeating call origination and interruption in accordance with a called party list which registers data of called parties; changing a state of a call in the setup state to a calling state so that a sum of the number of calls in the calling state and the number of calls in a busy state equals a predetermined value, which is determined by a queue model based on statistical data gathered in advance on the basis of a predetermined upper limit value of an occurrence rate of calls in a wait state, and is larger than the number of all the operator stations; and connecting a call, the state of which has changed to the calling state and to which a called party answers within a predetermined period of time, to a free operator or setting the call in the wait state in accordance with an operator list which registers free operators.

According to the present invention, calls in the setup state can be continuously supplied to a predetermined number of lines, e.g., a maximum number of lines that can be used. The number of calls is adjusted by only discriminating, in accordance with the above-mentioned criterion, whether the call in the setup state is continued or interrupted in the connection event. A sufficient number of calls immediately before they reach the connection event can be maintained, and the essential setup time can be shortened nearly to zero. Also, a busy called party (i.e., customer) is excluded in the connection event. However, since the present invention has calls in the setup state more than the number of calls to be excluded due to the busy state, the problem caused by the busy state can be substantially avoided.

As described above, according to the present invention, since the setup time and the busy rate can be substantially reduced, the operator efficiency can be improved in the power dialing system. Also, in the predictive dialing system, the operator efficiency can be improved while occurrence of the wait state of a called party (i.e., customer) for the connected call can be suppressed, or the generated wait time can be shortened.

According to the fourth aspect of the present invention, a dialing control method for a system which comprises a plurality of operator stations for automatically selecting and dialing customer telephone numbers at a paced rate, performs dialing in accordance with a called party list, and connects an answered call to the operator station, comprising the steps of: detecting that a called party is in a non-response state; and controlling another system not to perform dialing to the called party in the non-response state by sending non-response data of the called party from the system to the other system.

According to the fifth aspect of the present invention, the method further comprises the step of: sending response data indicating that the called party is in a response state from one system to the other system when one system dials to the called party who was determined to be in the non-response state, and the called party answers within a predetermined period.

According to the present invention, since the plurality of call centers can exchange and share data associated with absent and busy called parties (i.e., customers), calls to absent or busy called parties can be avoided from being originated. More specifically, when a certain call center detects an absent or busy called party, it supplies data indicating that the customer is absent or busy to other call centers. With this data, the other call centers can predict that a call is not connected even when the call is originated to the customer at that time, and can re-schedule the dialing order to make a call to such a customer later, thereby improving the operator efficiency.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the basic arrangement of a call center system according to Embodiment 1 of the present invention;

FIG. 2 is a block diagram showing in detail the arrangement of the call center system shown in FIG. 1;

FIG. 3 is a diagram for explaining an example of a completion prediction signal generator;

FIG. 6 is a block diagram showing the basic arrangement of a call center system according to Embodiment 2-1 of the present invention;

FIG. 7 is a chart showing the call status transition;

FIG. 13 is a flow chart showing the procedure of the call start processing;

FIG. 14 is a flow chart showing the procedure of the processing upon generation of a response event;

FIG. 17 is a block diagram showing the basic arrangement of a call center system according to Embodiment 2-2 of the present invention;

FIG. 18 is a view showing a wait queue model;

FIG. 19 is a block diagram showing the basic arrangement of a call center system according to Embodiment 3 of the present invention;

FIG. 21 is a table showing an example of the call list in call center 1;

FIG. 22 is a table showing an example of absent customer data sent from call center 1 to call center 2; and FIG. 23 is a table showing an example of the call list in call center 2.

DETAILED DESCRIPTION OF THE INVENTION

Figure 4:
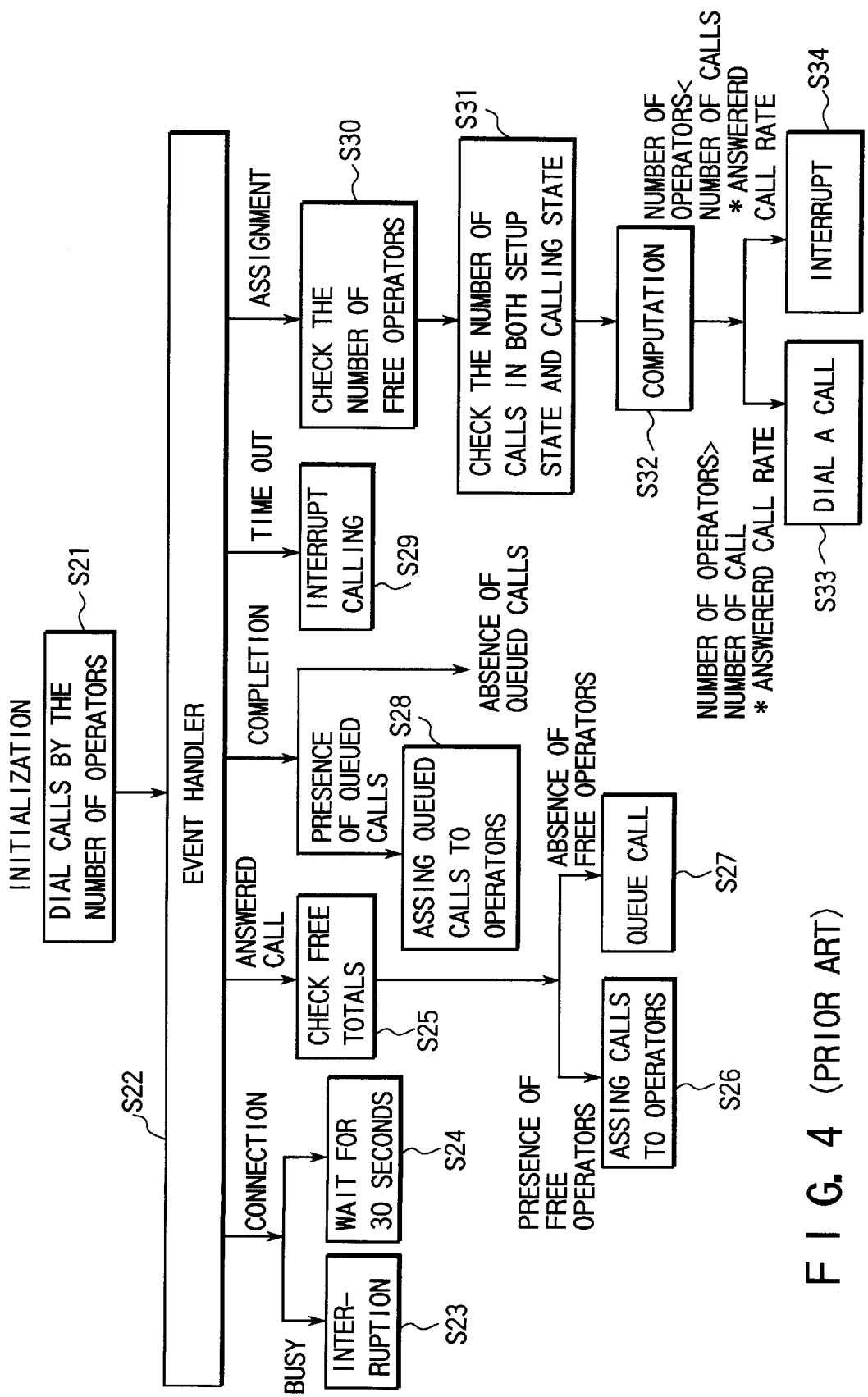
FIG. 4 is a flow chart showing the flow of the processing of conventional predictive dialing.

The preferred embodiments of the present invention will be described hereinafter with reference to the accompanying drawing.

In this embodiment, a customer means a person who is subjected to the outbound task, and includes not only a consumer as a target of, e.g., marketing, but also a subject of questionnairing.

In this embodiment, marketing will be described as an example of the outbound task, but the present invention can be applied to various outbound task processing systems.

Furthermore, the dialing control method according to present invention is not limited above system but can be applied to various systems.

Embodiment 1

FIG. 1 shows the basic arrangement of a call center system (outbound task processing system) of this embodiment.

As shown in FIG. 1, one terminal 30 and one telephone 40 are arranged for each operator, and the terminals 30 are connected to a host computer 20. The telephones 40 are connected to telephone lines via a PBX 10. The PBX 10 is connected to the host computer 20.

Each operator talks with the connected customer about the required contents via the telephone 40. A task program as a type of an application program runs on the terminal 30. For example, data read out from a customer file and associated with the customer of interest is displayed on the screen of the terminal 30, and required input fields are provided. Data input by the operator are stored in, e.g., a customer file, order file, or the like (not shown). When the operator has finished the task for one customer and inputs completion data to the terminal 30 or sets the telephone 40 in the on-hook state, the terminal 30 is reset to an initial screen, and the telephone 40 is connected to the next customer.

FIG. 2 shows in detail the arrangement of the call center system of this embodiment. FIG. 2 shows only one terminal 30, and the telephones 40 are not shown.

The host computer 20 comprises voiced answer-to-call rate measuring section 21 for receiving data indicating that each call result is a response or non-response from the PBX 10, and measuring the voiced answer-to-call rate, a setup time+calling time measuring section 22 for measuring an average setup time on the basis of the dialing time and the reception time of a setup completion signal from the PBX 10, a predictive dialing program 23, and a completion prediction queue 24. The terminal 30 comprises a completion prediction signal generator 31 for generating a completion prediction signal, and a task program (terminal program) 32 associated with a tele-marketing task.

Predictive dialing is realized as the program 23 on the host computer 20. On each terminal 30, the task program associated with the tele-marketing task runs. As a mechanism for informing the host computer 20 of the execution time of a specific portion in the task program 32, the completion prediction signal generator 31 is set. The predictive dialing program 23 on the host computer 20 records the data from the completion prediction signal generator 31 and the generation time of the data, and performs predictive dialing by reflecting them.

For example, the completion prediction signal generator 31 is realized as follows.

(1) Upon completion of talking, the operator performs a specific operation with respect to the terminal 30, e.g., inputs a specific key to the terminal 30 or selects a specific item on the screen, and the corresponding processing is executed. For example, as shown in FIG. 3, a routine for generating events ("connection of telephone", "answer to call", "completion of talking", "time out of calling", "assignment", and the like) is embedded in a post processing routine portion 231, which must be executed when the operator completes his or her task for one customer, in the task program 32. The completion prediction signal generator 31 sends data indicating execution of the specific portion to the predictive dialing program on the host computer 20 side in response to an event generated upon executing this portion.

(2) Each terminal indirectly detects execution of the post processing routine 231. For example, when data write access from the terminal 30 to an external storage device (not shown) is executed by the post processing routine 231 alone after the operator begins to talk with one customer, execution of the post processing routine 231 can be detected by detecting the data write access from the terminal 30 to the external storage device. The completion prediction signal generator 31 sends data indicating execution of a specific portion to the predictive dialing program 23 on the host computer 20 side in response to the detection of the data write access from the terminal 30 to the external storage device.

Note that various other methods may be used. For example, a command for issuing a detection signal may be embedded in the post processing routine, and when the terminal executes the command, a detection signal indicating execution of the post processing routine may be issued.

As described above, according to this embodiment, since the execution time of the specific portion of the task program on the operator's terminal can be informed, the predictive dialing program on the host computer can recognize in more detail the progress of each talk and can accurately predict the talk completion time. Accordingly, the predictive dialing performance can be improved, and hence, both the improvement of the operator efficiency and elimination of the wait state for the connected call can be attained.

This embodiment will be described in more detail below.

Prior to the description of this embodiment, a process flow in a conventional call center system will be explained with reference to typical predictive dialing processing shown in FIG. 4.

In the predictive dialing program, a corresponding function is started upon generation of an event. An event is sent from the PBX or operator's terminal.

First, the system is initialized (step S21). At this time, dialing is performed in correspondence with the number of operators. Subsequently, the overall processing is controlled in accordance with the generated event (step S22).

The event includes "connection of telephone", "answer to call", "completion of talking", "time out of calling", and the like. In this system, dialing is controlled while checking the talking state at predetermined time intervals. Accordingly, after an elapse of a predetermined period of time, the system is informed of an event by a timer interrupt. The system determines the number of calls in accordance with the current state, and performs dialing.

If a connection event is generated, it is checked if the called customer is busy. If the customer is busy, the line is disconnected (step S23); otherwise, the calling tone is generated, and the control waits for a predetermined period of time or until the customer answers the call. In this case, the predetermined period of time is set to be 30 sec (step S24).

If the customer answers the call, a free operator (free totals) is checked (step S25). If a free operator is found, the call is assigned to the operator (step S26). If a free operator is not found, the call is queued (step S27).

If the operator completes talking, it is checked if the calls are queued. If the queued call is found, it is assigned to the operator (step S28). If the queued call is not found, the operator waits since there is no call to be assigned.

A time-out event is generated when the customer does not answer the call after the ringing tone is kept generated for 30 sec. In this case, it is determined that the customer is absent, and dialing is interrupted (step S29).

In the conventional predictive dialing system, dialing is performed at predetermined time intervals. In the predictive dialing system, the number of free operators and the number of calls in progress are checked (steps S30 and S31), and an appropriate number of calls to be originated is predicted. In this case, a computation is made in consideration of the voiced answer-to-call rate. (step S32).

For example, let OP be the number of free operators, $N_{inprogress}$ be the number of calls in progress, and $A_{ratio}$ be the voiced answer-to-call rate. Then, the number of calls to be originated is computed by:

$OP/A_{ratio} - N_{inprogress}$

More specifically, $OP/A_{ratio}$ represents the average number of calls to be originated corresponding to OP, and $N_{inprogress}$ is subtracted from $OP/A_{ratio}$, thus obtaining the number of new calls to be originated.

If the computed value is positive, dialing is performed in correspondence with the computed number of calls (step S33); if the computed value is negative, dialing is not performed (step S34).

As a problem of the conventional call center system, since dialing is not performed when there is no free operator, a certain operator who completes talking during talking of all the operators becomes free, and the operator efficiency cannot be improved very much.

In view of this problem, a method which detects an operator whose talking time is longer than the average value as a free operator from those in conversation may be used. However, with this method, when the conversation is not completed, no free operator is present for the call to which the customer answers.

In order to solve this problem, in this embodiment, an operator who is about to complete talking is detected in advance, and dialing is made based on the detection result. This embodiment will be described in detail below. In the following description, the differences between this embodiment and the call center system described above with reference to FIG. 4 will be mainly explained.

Figure 5:
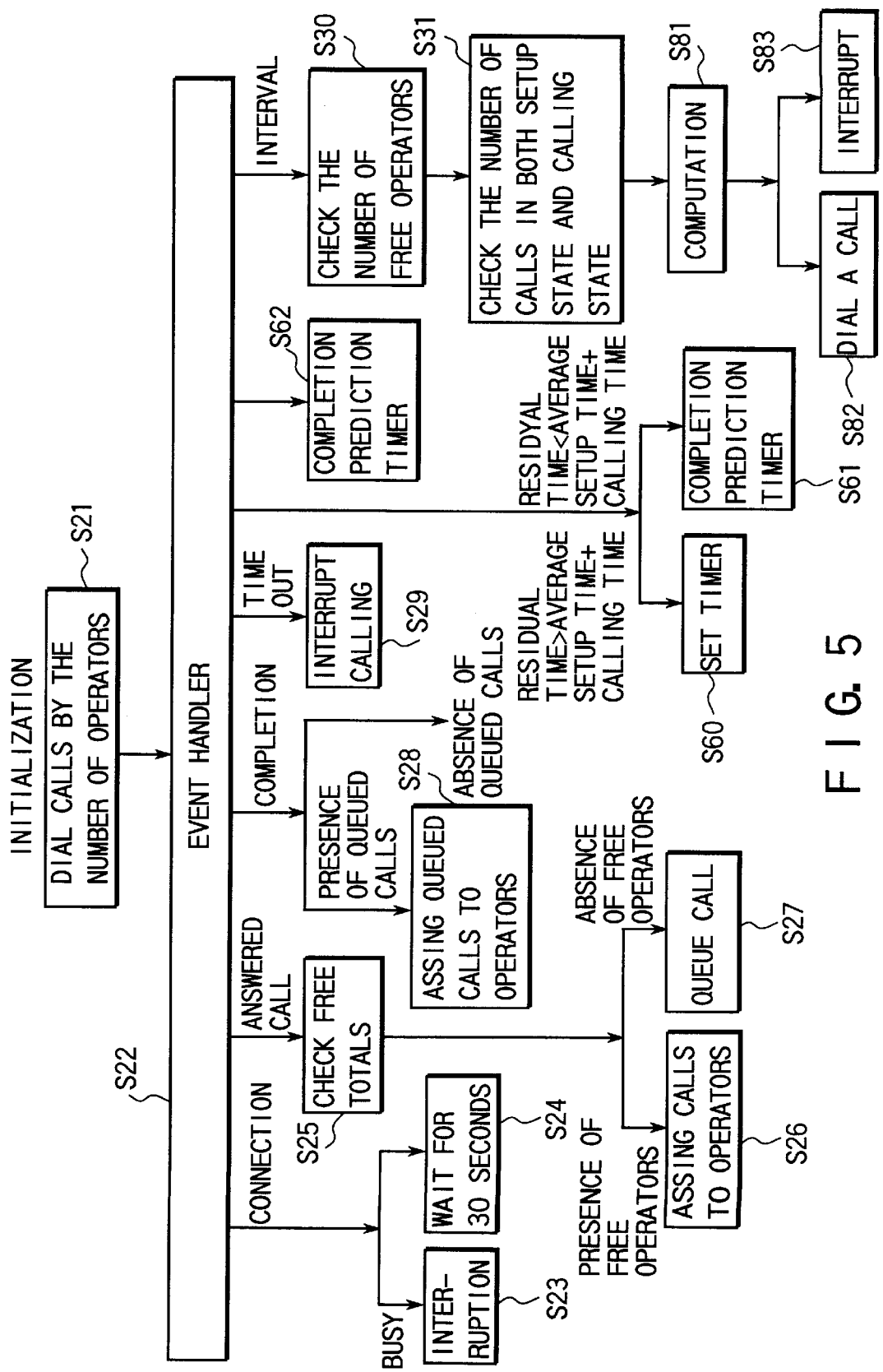
FIG. 5 is a flow chart showing the flow of the processing of predictive dialing according to Embodiment 1.

FIG. 5 shows the procedure of the predictive dialing processing in the call center system according to this embodiment. In the processing shown in FIG. 5, a corresponding function is started upon generation of an event.

In this embodiment, dialing in step S21, the function of controlling the overall processing in correspondence with the generated event (step S22), the function corresponding to the connection event (steps S23 and S24), the function corresponding to the response event from the customer (steps S25 to S27), the function corresponding to the talk-completion event of the operator (step S28), and the function corresponding to the time-out event (step S29) are the same as those in FIG. 4.

The characteristic feature of predictive dialing of this embodiment is to process a completion prediction signal supplied from the completion prediction signal generator 31 in the terminal 30 (FIG. 2) as an event. This mechanism can be realized by embedding a function of informing the host computer 20 of execution of a specific portion in the task program 32 running on the operator's terminal 30, as described above.

Upon generation of an event corresponding to the completion prediction signal, a residual time is compared with an average setup time+calling time supplied from the setup time measuring section 22. If the residual time is longer than the average setup time+calling time, a timer (not shown) is set to generate an event (residual time)–(average setup time+calling time) later (step S60). On the other hand, if the residual time is shorter than the average setup time+calling time, the operator corresponding to the completion prediction signal is immediately registered in the completion prediction queue 24 (step S61). When the event is generated by the timer (not shown), the corresponding operator is similarly registered in the completion prediction queue 24 (step S62). This corresponds to prediction of a free operator the average setup time+calling time before.

A method of performing dialing using data supplied from the completion prediction queue 24 will be described below.

Dialing is performed at predetermined time intervals as in FIG. 4. The difference from FIG. 4 is the computation method of the number of calls to be originated in step S81.

In this embodiment, let OP be the number of free operators, CANDIDATE be the number of operators registered in the completion prediction queue 24, $N_{inprogress}$ be the number of calls in progress, and $A_{ratio}$ be the voiced answer-to-call rate supplied from the voiced answer-to-call rate measuring section 21. Then, the number of calls to be originated is computed by:

$(OP+CANDIDATE)/A_{ratio} - N_{inprogress}$

That is, the number of calls to be originated is computed in consideration of the number of operators (corresponding to CANDIDATE) who will be free the average setup time after.

If the computed value is positive, dialing is performed in correspondence with the computed number of calls in accordance with a call list (not shown) (step S82); if the computed value is negative, dialing is not performed (step S83).

As a consequence, the problem of the system shown in FIG. 4, i.e., "a certain operator who completes talking during talking of all the operators becomes free", can be solved, and the operator efficiency can be improved.

As described above, according to this embodiment, since the completion of talking of the operator can be predicted with higher precision, the operator efficiency can be improved while occurrence of the wait state of the customer for the connected call can be suppressed or the generated wait time is shortened.

Embodiment 2-1

FIG. 6 shows the arrangement of a call center system (outbound task processing system) of this embodiment. The call center of this embodiment performs power dialing.

As shown in FIG. 6, one terminal 130 and one telephone (not shown) are arranged for each operator, and the terminals 130 are connected to a host computer 120. The telephones are connected to trunks via a PBX 110. The PBX 110 is connected to the host computer 120.

Each operator talks with the connected customer about the required contents via the telephone. A task program runs on the terminal 130. For example, data read out from a customer file and associated with the customer of interest is displayed on the screen of the terminal 130, and required input fields are provided. Data input by the operator are stored in, e.g., a customer file, order file, or the like (not shown). When the operator has finished the task for one customer and inputs completion data to the terminal 130 or sets the telephone in the on-hook state, the terminal 130 is reset to an initial screen, and the telephone is connected to the next customer.

As shown in FIG. 6, the host computer 120 comprises a scheduler 121, a dialer 122, a timer 123, a next customer selecting section 124, a redial list 125, a call list 126, an execution-continuation determining section 127, and a free operator list 128. Also, the PBX 110 comprises a connection state detector 111.

The scheduler 121 is a program for managing the entire outbound task. In this embodiment, the scheduler 121 is installed in the host computer 120.

The dialer 122 has a function of making a call to a customer designated by an instruction from the scheduler 121, a function of interrupting the call, and the like.

The call list 126 is a list of customers to be subjected to the outbound task.

The timer 123 has a function of informing the scheduler 121 of an elapse of the designated time after a certain call is set in the calling state. In this case, the scheduler 121 determines that the customer is absent, and interrupts the call.

The execution-continuation determining section 127 determines whether or not the call is to be continued or to be interrupted by a method to be described later, when a certain call is in the calling state in an connection event.

The redial list 125 registers customers corresponding to calls interrupted by the execution-continuation determining section 127.

The next customer selecting section 124 selects the next customer to be called from the call list 126 or the redial list 125.

The free operator list 128 is a list of free operators.

The connection state detector 111 always monitors the states of the telephone lines. The connection state detector 111 identifies the state of the telephone line of interest based on its response tone. That is, when a busy tone is detected, the detector 111 determines that the customer is busy; when a calling tone is detected, the detector 111 determines that the customer is in calling state. The connection state detector 111 informs the scheduler 121 of an event corresponding to the line, the state of which has changed, and the changed state by identifying the tones.

The scheduler 121 of this embodiment detects events associated with individual calls, and manages status transition of each call accordingly. In this embodiment, the events include a start event, connection event, time-out event, response event, and talk-completion event.

The start event is generated when the scheduler 121 itself requests the dialer 122 to start dialing.

The connection event is generated when the call is connected to the customer upon completion of the setup processing. The connection event is informed from the connection state detector 111.

The time-out event is generated when the designated time has elapsed while a ringing tone is being produced. In this case, it is determined that the customer is absent. The time-out event is informed from the timer 123.

The response event is generated when the customer answers the call. The response event is informed from the connection state detector 111.

The talk-completion event is generated when conversation between the customer and the operator completes. The talk-completion event is informed from the terminal 130.

In this embodiment, the call state undergoes status transition shown in FIG. 7 upon generation of events from dialing to completion.

In the setup state, the line is being connected to the public network.

In the calling state, the call is connected, and a calling tone is being produced.

In the busy state, the customer is busy.

In the wait state, the (answered) customer waits for a free operator. Note that this state is not generated in power dialing.

In the talking state, the customer is talking with the operator.

In the completion state, the call is interrupted or completed.

As shown in FIG. 7, after the call state transits to the setup state (S101 in FIG. 7) upon generation of the start event, it transits to the calling state S(102) or busy state (S103).

After the busy state (S103), the call state transits to the completion state (S106).

After the calling state (S102), the call state transits to the talking state (S104) immediately or via the wait state (S103), and then transits to the completion state (S106). Alternatively, the call state transits to the completion state (S106) upon generation of the time-out event.

Figure 8:
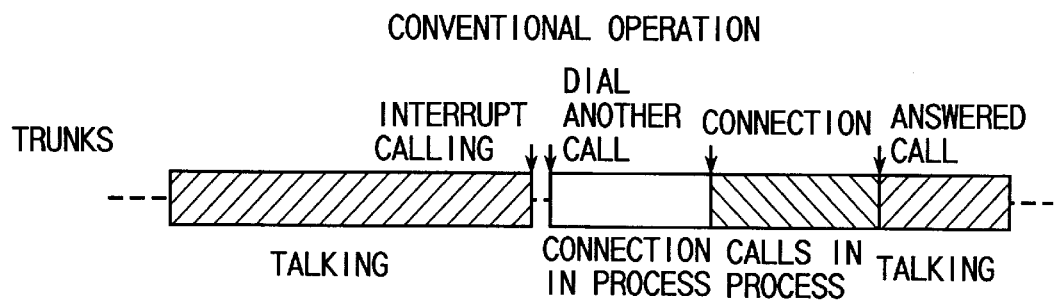
FIG. 8 is a schematic view for explaining a conventional power dialing system.
Figure 9:
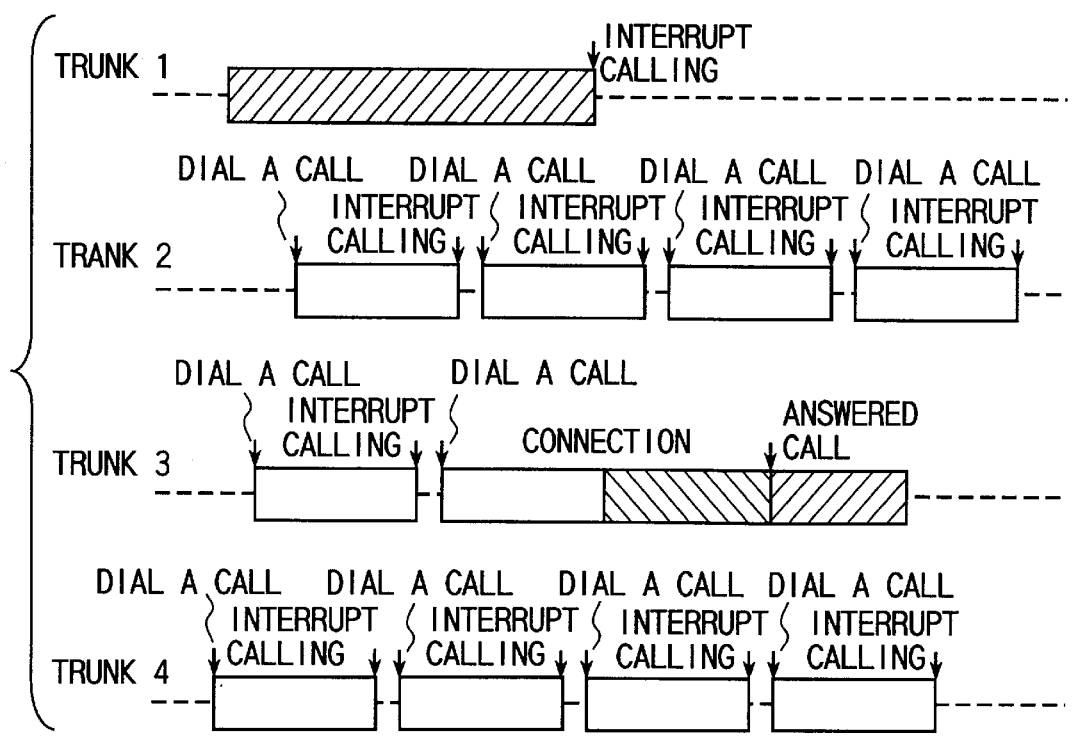
FIG. 9 is a schematic view for explaining a power dialing system according to the present invention.

As will be described later, in this embodiment, the number of calls in the states after connection (i.e., calls in the calling state, wait state, and talking state) is important. Hence, in the following description, such states will be referred to as effective states hereinafter. Also, if the number of calls in the effective state is referred to as the number of effective calls, it is given by:

Number of effective calls=number of calls in calling state+number of calls in talking state In this connection, in Embodiment 2-2 (to be described later) that performs predictive dialing, the number of effective calls is given by:

Number of effective calls=number of calls in calling state+number of calls in wait state+number of calls in talking state The scheduler 121 of this embodiment manages the available trunks to be always in use. In the initialization, the scheduler 121 requests the dialer 122 to select customers corresponding in number to the number of available trunks from the call list 126 and to make calls. In conventional power dialing, calls more than the number of operators are not originated so as to prevent customers from waiting for operators. More specifically, as shown in FIG. 8, after conversation is completed at a certain trunk, the next call is made. In contrast to this, in this embodiment, the number of telephone lines connected to the call center is set to be larger than the number of operators, and calls more than the number of operators are originated at the same time. More specifically, as shown in FIG. 9, a plurality of trunks are periodically subjected to dialing and interruption of calling, and when an operator at a certain line (e.g., trunk 1) completes talking, another line having the shortest time until connection (trunk 3 in FIG. 9) is connected to the operator of line 1.

When the call is connected to the customer, if the customer is busy, a busy tone is produced; otherwise, a ringing tone is produced. The connection state detector 111 identifies such tones at the instance when the call is connected, and informs the scheduler 121 of the busy or calling state of the call.

When the scheduler 121 is informed of the calling state of the call, it asks the execution-continuation determining section 127 to make determination. The execution-continuation determining section 127 compares the current number of effective calls with the number of operators. When the number of effective calls is smaller than the number of operators, the section 127 determines that the call is to be continued. In this case, since the customer may be absent, the section 127 sets the timer to interrupt the call when the customer does not answer after an elapse of the designated time.

If the number of effective calls is equal to or larger than the number of operators, when such calls transit to the effective state, responses to calls that cannot be coped with by the operators may be generated. Therefore, the execution-continuation determining section 127 determines to interrupt the call, and upon reception of this data, the scheduler 121 immediately interrupts the call. The customer of the interrupted call is registered in the redial list 125 to perform redialing later.

In the case of the time-out event or talk-completion event, since the scheduler 121 completes talking, a line is released.

At this time, the scheduler 121 selects another customer from the redialing list 125 or call list 126, and performs dialing.

The flow of the processing of the scheduler of this embodiment will be described in more detail below.

Figure 10:
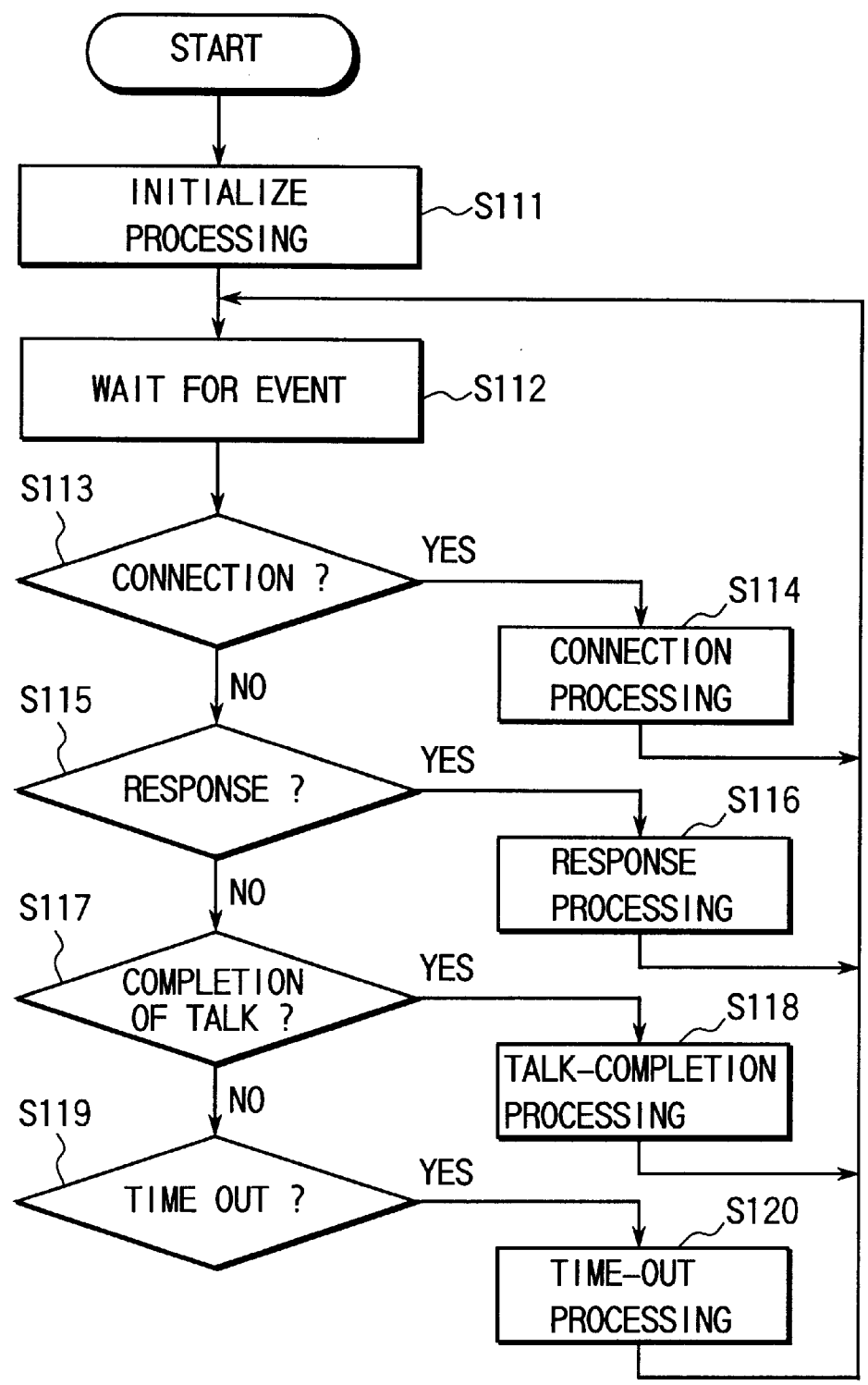
FIG. 10 is a flow chart showing the procedure of the main processing of a scheduler.

FIG. 10 shows the flow of principal part of the processing of the scheduler of this embodiment.

Figure 11:
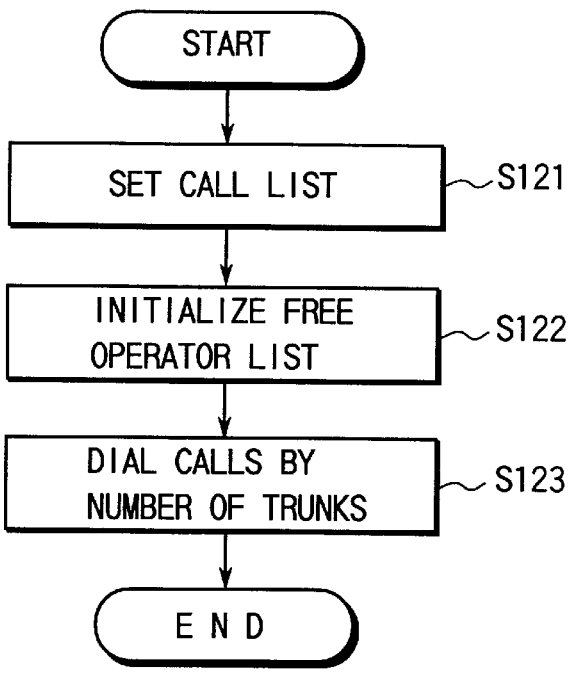
FIG. 11 is a flow chart showing the procedure of the initialize processing.

First, initialize processing is performed (step S111). FIG. 11 shows in detail the initialize processing. The call list 126 is set (step S121), and the free operator list 128 is initialized (step S122). After a series of preparation operations required upon starting the outbound task are performed, dialing to customers is started (step S123).

In this embodiment, prior to dialing in step S123, the scheduler 121 is informed in advance of the number of trunks that can be used in the outbound task. The scheduler 121 picks up telephone numbers of customers corresponding in number to the informed number of trunks from the call list 124 using the next customer selecting section 124. The scheduler 121 transfers these telephone numbers to the dialer 122 to make calls by the number of trunks (step S123). Thereafter, the scheduler 121 waits for events (step S112), and performs processing (steps S114, S116, S118, and S120) in correspondence with events generated (steps S113, S115, S117, and S119).

As described above, the scheduler 121 performs processing corresponding to the generated event. After dialing, the scheduler 121 receives the connection event (step S113) first, and processing (step S114) corresponding to the connection event is one of the characteristic features of this embodiment. The processing corresponding to the connection event will be explained below.

Figure 12:
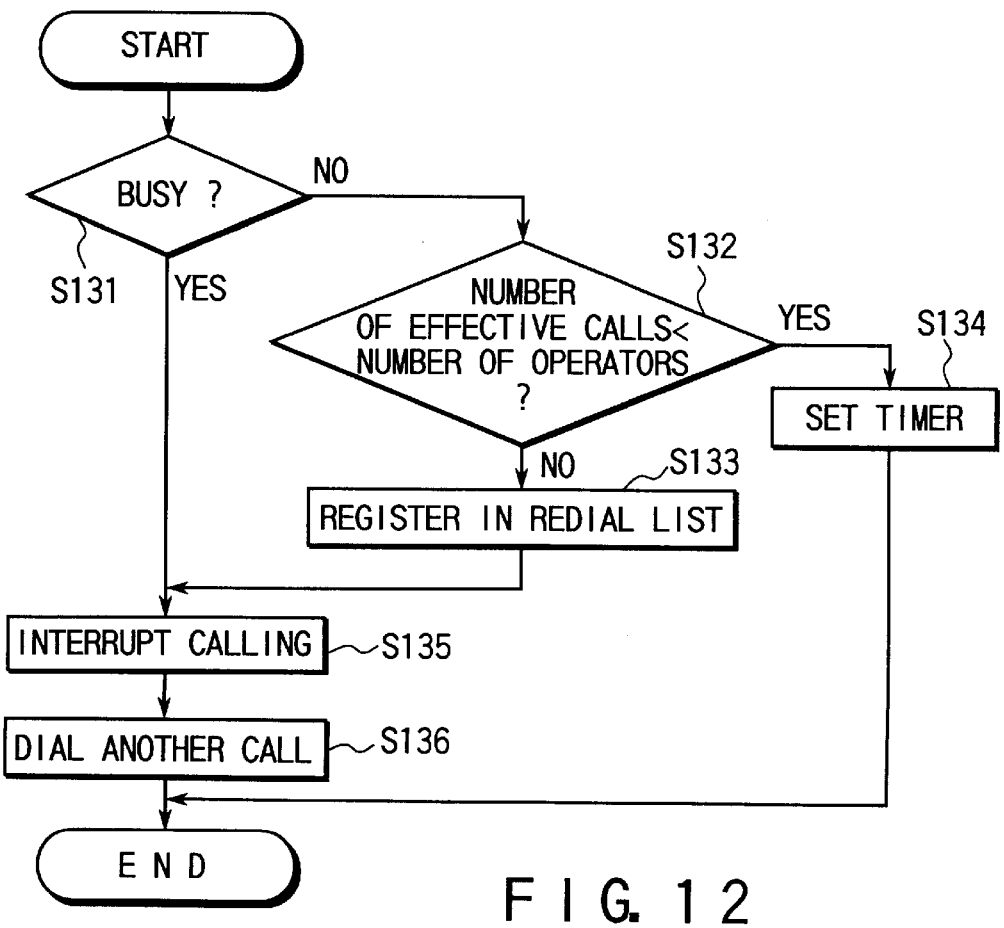
FIG. 12 is a flow chart showing the procedure of the processing upon generation of a connection event.

FIG. 12 shows the processing upon generation of the connection event. The scheduler 121 receives the call state from the connection state detector 111 (step S131). If the received call state indicates the busy state, the scheduler 121 interrupts the call (step S135) and makes another call (step S136). When the received call state indicates the calling state, the execution-continuation determining section 127 determines if this call is to be continued (step S132).

The execution-continuation determining section 127 always recognizes the number of effective calls by measuring the number of calls set in the effective state and the number of interrupted or completed calls. When another call enters the calling state, the execution-continuation determining section 127 compares the current number of effective calls with the number of operators.

If the number of effective calls is smaller than the number of operators, the operators can sufficiently cope with responses even when this call is continued. Therefore, the execution-continuation determining section 127 determines to continue the call. The scheduler 121 continues the call of interest in accordance with the determination result of the execution-continuation determining section 127, so as to keep calling the customer. However, in order to cope with the case of an absent customer, the scheduler 121 designates a predetermined time in the timer 121, and programs the timer 121 to generate a time-out event after an elapse of the designated time.

Conversely, if the number of effective calls is larger than the number of operators, when the call of interest transits to the effective state, the number of calls may exceed the number of operators. For this reason, the execution-continuation determining section 127 determines to interrupt the call. Upon receiving the determination result "interrupt" from the execution-continuation determining section 127, the scheduler 121 registers the customer of the call of interest in the redial list 125 (step S133). In this case, since the task is not done for the customer and it is not determined that the customer is absent, redialing must be performed. Thereafter, the scheduler 121 interrupts the call of interest (step S135). When the call is interrupted, the corresponding line is released and, hence, the scheduler 121 makes another call (step S136).

Figure 15:
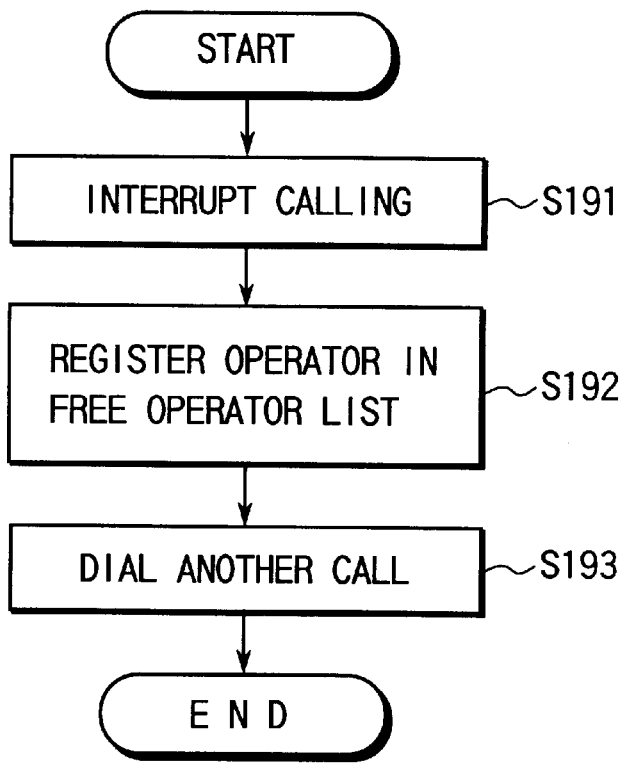
FIG. 15 is a flow chart showing the procedure of the processing upon generation of a talk-completion event.
Figure 16:
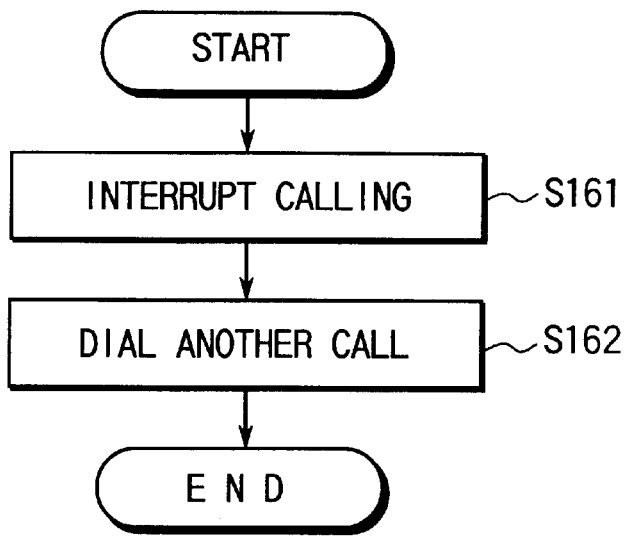
FIG. 16 is a flow chart showing the processing upon generation of a time-out event.

FIG. 13 shows the flow of the processing upon making another call (step S136 in FIG. 12, step S193 in FIG. 15, and step S162 in FIG. 16).

The scheduler 121 asks the next customer selecting section 124 to select the next customer to be dialed. At this time, the next customer selecting section 123 can make one of a choice of selecting a customer who is not dialed yet from the call list 126 and a choice of selecting a customer from the redial list 125. In this case, either of these choices may be arbitrarily made. For example, when the call list 126 lists customers in the order of important ones, a customer may be preferentially selected from the redial list 125. FIG. 13 exemplifies such a case, and a customer is selected from the redial list 125 unless the redial list 125 is empty; otherwise, a customer is selected from the call list 126. In any case, the scheduler 121 instructs the dialer 122 to make a call to the customer selected by the next customer selecting section 124.

The processing corresponding to the response event shown in step S116 in FIG. 10 will be described below. FIG. 14 shows the flow of the processing corresponding to the response event.

The scheduler 121 selects a free operator, and connects the line to the selected operator. Since the execution-continuation determining section 127 limits the number of effective calls not to exceed the number of operators, a free operator can be found. The selected operator is removed from the free operator list 128. Also, the scheduler 121 cancels the timer set for the call of interest.

The processing corresponding to the talk-completion event shown in step S118 in FIG. 10 will be described below. FIG. 15 shows the flow of the processing corresponding to the talk-completion event.

Since conversation is completed, the scheduler 121 cuts off the call (step S191). The operator who has completed conversation is registered in the free operator list 128. Since the corresponding trunk is released, the scheduler 121 performs the dialing processing shown in FIG. 13 (step S193).

The processing corresponding to the time-out event shown in step S120 in FIG. 10 will be explained below. FIG. 16 shows the flow of the processing corresponding to the time-out event.

In this case, the timer 123 informs the scheduler 121 of the call corresponding to the time-out event generated. The scheduler 121 interrupts the call (step S161). Since the corresponding trunk is released, the scheduler performs the dialing processing shown in FIG. 13 (step S162).

As has already been described above, in conventional power dialing, the setup time considerably bottlenecks improvement of the operator use efficiency. In order to prevent this, in this embodiment, calls in the setup state are kept supplied to the trunks. The number of calls is adjusted by only determining if the calls in the setup state are continued or interrupted. With this control, since a sufficient number of calls immediately before the connection event can be maintained, the setup time can be substantially reduced to zero. A busy customer is excluded in the connection event. In this embodiment, since the number of calls in the setup state is sufficiently larger than the number of calls removed due to the busy state, the problem caused by the busy state can be substantially avoided.

As described above, according to this embodiment, in the outbound task system based on power dialing, since the setup time and the busy rate can be substantially reduced, the operator efficiency can be improved.

Embodiment 2-2

FIG. 17 shows the arrangement of a call center system (outbound task processing system) of this embodiment.

The call center system of this embodiment performs predictive dialing, and an operation predicting section 1272, a statistical data gathering section 1271, and a wait queue 129 are added to the arrangement for power dialing shown in FIG. 6. In the following description, the difference between this embodiment and Embodiment 2-1 above will be mainly explained.

In predictive dialing, since dialing is performed by predicting a free operator, the number of operators temporarily becomes short if prediction fails. The wait queue 129 registers calls in the wait state, and a call in the wait queue is preferentially assigned to a free operator who has just finished the task.

The operation predicting section 1272 has an operation model of the system, and predicts, based on the model, the behavior of the system in the future, e.g., that an operator will be free, or the number of operators will be short and the number of calls in the wait queue will increase.

The statistical data gathering section 1271 gathers various statistical data required for the operation predicting section 1272 to predict the system operation.

In this embodiment, the basic operation is the same as that in Embodiment 2-1. However, since predictive dialing is performed, the determination method of the execution-continuation determining section 127 when the call transits to the calling state in the connection event is different from that in Embodiment 2-1. In the case of Embodiment 2-1 that performs power dialing, the section 127 makes a relatively simple decision by merely comparing the number of effective calls with the number of operators. However, in this embodiment that performs predictive dialing, the operation predicting section 1272 determines, on the basis of the current service state of operators, the wait state of calls, and the history data gathered by the statistical data gathering section 1271, if an operator will become free. If it is predicted that an operator will become free, the call of interest is continued; otherwise, the call of interest is interrupted, and the customer corresponding to the interrupted call is registered in the redial list 125. In the case of predictive dialing, when a customer answers, all the operators may be talking with other customers. In this case, the call of interest is registered in the wait queue 129. When an operator has completed talking, i.e., when the scheduler 121 is informed of the talk-completion event, the call is picked up from the wait queue 129, and is assigned to the free operator.

The operation predicting section 1272 models the entire outbound task processing system as a queuing system, as shown in FIG. 18. In this model, talking events correspond to calls, and operators correspond to windows. In this case, the operation predicting section 1272 adopts a constant call number control method. In the constant call number method, the entire queuing network of queues is considered as a single system, and a predetermined number of calls are input to the system. If one of these calls exits the system, another call is immediately input to the system. In this way, the control for maintaining the number of calls in the system constant is referred to as the constant call number method.

In this method, when a call is in the effective state, it is determined that the call is present in the system. According to this embodiment, since the number of calls in the setup state can be maintained to be a sufficiently large value, when the call exits the system due to the time-out event or talk-completion event, another call can be immediately supplied to the system. Accordingly, the constant call number control can be approximately made.

The system controlled by the constant call number method can be modelled as a so-called closed queuing network queues in the queuing theory.

Parameters are defined as follows:

Ns: the number of calls in the calling state

Nq: the number of calls in the wait state

Na: the number of calls in the talking state

The number N of calls in the system (the number of effective calls) can be described by:

$$N = N_s + N_q + N_a \quad (1)$$

Also, $P_k$: the probability the system falls in the state Nq+Na=k ($0 \leq k \leq N$)

$\lambda_S$: the rate the call in the calling state is connected (1/sec)

$\lambda_T$: the talk-completion rate (1/sec)

Then, $P_k$ is expressed by equations (2) and (3) below. Note that $P_0$ is given by equation (4), and S is the number of operators.

$$P_k = \frac{N!}{(N-k)!k!}\left(\frac{\lambda_S}{\lambda_T}\right)^k P_0 \quad (0 \leq k \leq S) \quad (2)$$

$$= \frac{N!}{(N-k)!S^{k-S}S!}\left(\frac{\lambda_S}{\lambda_T}\right)^k P_0 \quad (S+1 \leq k \leq N) \quad (3)$$

$$P_0 = \frac{1}{\sum_{k=0}^{S}\frac{N!}{(N-k)!k!}\left(\frac{\lambda_S}{\lambda_T}\right)^k + \sum_{k=S+1}^{N}\frac{N!}{(N-k)!S^{k-S}S!}\left(\frac{\lambda_S}{\lambda_T}\right)^k} \quad (4)$$

In this case, the customer must wait when Nq+Na>S. Therefore, the probability the wait state is generated is described by:

$$Pw = PS+1 + \ldots + PN \quad (5)$$

The operation predicting section 1272 is given in advance an allowable wait occurrence rate þ. The operation predicting section 1272 computes maximum N that can realize:

$$PW \leq \theta \quad (6)$$

The computation performed by the operation predicting section 1272 requires two parameters, i.e., $\lambda_S$ and $\lambda_T$. These parameters can be computed based on the average calling time, average talking time, absence rate, and the like. For this purpose, the statistical data gathering section 1271 gathers the history data of calls from the beginning of the outbound task.

Various methods of gathering the history data may be used. For example, the following method is preferable. That is, since the condition varies depending on different time bands, e.g., the morning and night even in the task in a day, the average values are preferably computed during a predetermined period, e.g., in one hour. For example, the statistical data gathering section 1271 is designated in advance a time interval $T_{span}$ for gathering data, and holds history data of calls which entered the effective state during the period [current time–$T_{span}$, current time].

Based on such data, the following computations are made:

average calling time=total of calling times of all calls/number of calls average talking time=total of talking times of answered calls/number of answered calls absence rate=number of calls corresponding to time-out event/number of all calls $\lambda_S$ and $\lambda_T$ are respectively computed by:

$\lambda_S$=(1—absence rate)/average calling time $\lambda_T$=1/average talking time The execution-continuation determining section 127 permits continuation of dialing when the number of effective calls is smaller than N; otherwise, it interrupts dialing.

As has already been described above, in conventional predictive dialing, the setup time considerably bottlenecks improvement of the operator use efficiency. In order to prevent this, in this embodiment, calls in the setup state are kept supplied to the lines. The number of calls is adjusted by only determining if the calls in the setup state are continued or interrupted. With this control, since a sufficient number of calls immediately before the connection event can be maintained, the setup time can be substantially reduced to zero. A busy customer is removed in the connection event. In this embodiment, since the number of calls in the setup state is sufficiently larger than the number of calls removed due to the busy state, the problem caused by the busy state can be substantially avoided.

As described above, according to this embodiment, in the outbound task processing system based on predictive dialing, since the setup time and the busy rate can be substantially reduced, the operator efficiency can be improved while occurrence of the wait state of a customer for the connected call can be suppressed, or the generated wait time can be shortened.

Embodiment 3

Embodiment 3 will be explained below.

The arrangement of each call center system (outbound task processing system) of this embodiment is basically the same as that shown in FIG. 19.

More specifically, as shown in FIG. 19, one terminal 304 and one telephone 305 are arranged per operator (303 in FIG. 19), and the terminals 304 are connected to a host computer 201. The telephones are connected to telephone lines via a PBX 306.

In the most basic system, the telephone numbers of customers are displayed on each terminal 304 in accordance with a call list 211, and the operator manually dials the telephone number to make a call. In a basic system in which the host computer 201 links with the PBX 306, a call is automatically originated via the PBX 306 (in accordance with the call list 211) in accordance with an instruction from each terminal 304, and is connected to the corresponding telephone 305. In a system that performs power dialing or predictive dialing, the PBX 306 is connected to the host computer 201, and calls are automatically originated in accordance with the call list 211. The present invention can be applied to any of the above-mentioned systems.

Each operator talks with the connected customer about the required contents via the telephone 305. A task program runs on the terminal 304. For example, data read out from a customer file and associated with the customer of interest is displayed on the screen of the terminal 304, and required input fields are provided. Data input by the operator are stored in, e.g., a customer file, order file, or the like (not shown). When the operator has finished the task for one customer and inputs completion data to the terminal 304 or sets the telephone 305 in the off-hook state, the terminal 304 is reset to an initial screen, and the telephone 305 is connected to the next customer and/or the next customer to be connected is instructed to the telephone 305.

Figure 20:
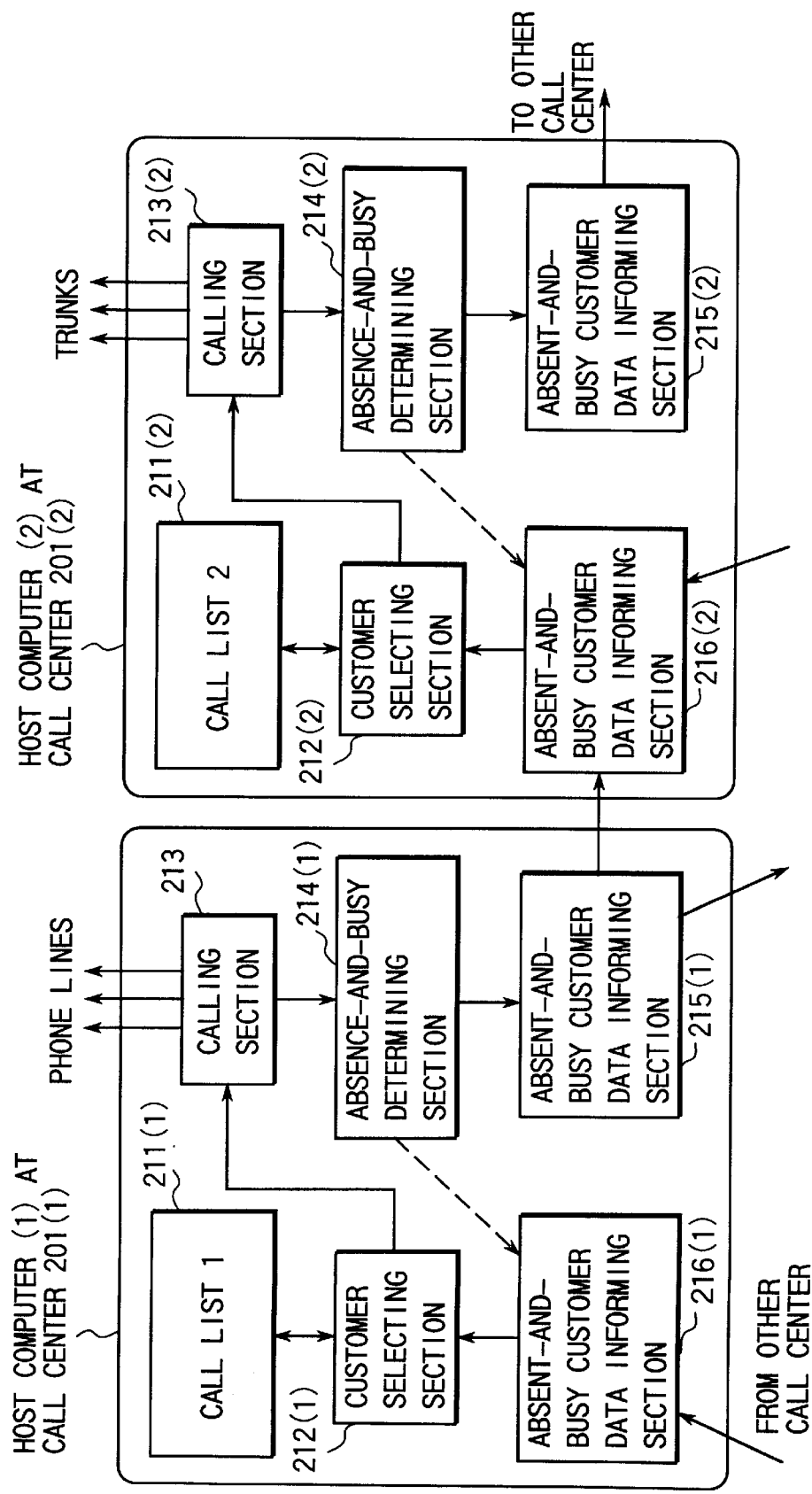
FIG. 20 is a block diagram showing the linking state of two call center systems, and an example of the internal arrangement of a host computer in each call center system.

In this embodiment, linking of a plurality of call center systems will be examined. FIG. 20 shows linking of two call center systems, and an example of the internal arrangement of the host computer 201 in each call center system.

The host computer 201 of this embodiment comprises the call list 211, a customer selecting section 212, a telephone dialing section 213, an absence-and-busy determining section 214, a customer data informing section 215, and a customer data receiving section 216.

In this embodiment, when a call center system (1) (to be referred to as call center 1 hereinafter) and a call center system (2) (to be referred to as call center 2 hereinafter) link, one call center 1 serves as a data provider, and the other call center 2 serves as a data receiver.

Upon linking of two call centers, i.e., call center 1 and call center 2, in call center 1, a customer selecting section 212(1) selects a customer to be dialed from a call list 211(1), and a telephone dialing section 213(1) performs dialing based on the selected customer. As a result of dialing to the customer, when an absence-and-busy determining section 214(1) determines that the customer is absent or busy, a customer data informing section 215(1) informs call center 2 (a customer data receiving section 216(2) thereof) of absent/busy customer data.

In call center 2, the customer data receiving section 216(2) receives the absent/busy customer data, and informs a customer selecting section 212(2) of it. The customer selecting section 212(2) controls not to make a call to the absent or busy customer before an elapse of a predetermined period of time from the absence-and-busy determining time upon selecting a customer to be dialed from a call list 211(2).

With this control, in call center 2, dialing to customers who are determined to be absent or busy can be avoided.

This embodiment will be described using an example.

A case will be exemplified below wherein call center 1 of the two call centers shown in FIG. 20 informs call center 2 of absent customer data.

Assume that call list 1 (211(1)) in call center 1 has the contents shown in FIG. 21. In this case, call center 1 performs dialing in the following procedure.

The customer selecting section 212(1) picks up the telephone number of the first customer, Mr. A, from call list 1, and makes a call to Mr. A. Assume that the line is connected to Mr. A and tele-marketing is done. Note that there is no absence data about Mr. A at that time.

Then, the customer selecting section 212(1) picks up the telephone number of the next customer, Mr. B, from call list 1, and makes a call to Mr. B. Assume that Mr. B is absent. In this case, since the center actually dials the telephone number of Mr. B and determines if Mr. B is absent by checking if Mr. B answers within a predetermined period of time, the time required for dialing the telephone number of Mr. B until the absence of Mr. B is confirmed is wasteful.

When the absence of Mr. B is confirmed, the customer data informing section 215(1) informs call center 2 of data indicating that Mr. B is absent. FIG. 22 shows an example of data sent to center 2 in such case. In this case, data including data indicating that Mr. B is absent, the absence detection time of Mr. B, and the telephone number of Mr. B is sent.

The customer data receiving section 216(2) of call center 2 receives the data shown in FIG. 22.

Note that data indicating that Mr. B is absent, the detection time, and the like are stored in a customer data receiving section 216(1) or a specific field of call center 1.

The procedure in call center 2 that concurrently performs tele-marketing task will be described below.

Assume that call list 2 (211(2)) in call center 2 has the contents shown in FIG. 23.

A customer selecting section 217(2) picks up the telephone number of the first customer, Mr. X, in call list 2 as a dialing candidate. In this case, the section 217(2) looks up the customer data receiving section 216(2) to check if absence data of Mr. X has been received. When data such as absence data of a customer detected in call center 2 is to be recorded in the call list, the column of absence data of Mr. X in call list 2 is also checked.

In this case, since no absence data of Mr. X is received, a call is originated to Mr. X. Assume that the line is connected to Mr. X, and tele-marketing is done.

The customer selecting section 217(2) picks up the telephone number of the next customer, Mr. B, in call list 2. Then, the section 217(2) looks up the customer data receiving section 216(2) to check if absence data of Mr. B has been received.

Assume that the absence data of Mr. B shown in FIG. 22 has been received.

The customer selecting section 217(2) compares the current time with the time in the absence data of Mr. B. If a predetermined period of time has not elapsed from the absence detection time of Mr. B yet, the section 217(2) determines that Mr. B may be still absent, postpones dialing to Mr. B, and picks up the telephone number of Mr. Y as the next customer.

With this control, the wasteful time required from when dialing to Mr. B who may be still absent is made until the absence of Mr. B is determined by confirming that Mr. B does not answer within a predetermined period of time, can be omitted.

Note that the absence data or the like of the customer is invalidated after an elapse of the predetermined period of time. As for a customer whose absence data or the like is invalidated, redialing may be made at that time, or the redialing timing may be determined according to another policy.

In the above example, when Mr. B is busy, call center 1 informs call center 2 of data indicating that Mr. B is busy, and call center 2 can omit the wasteful time of dialing to Mr. B who may be still busy and confirming the busy state of Mr. B.

The invention of informing absence data and the invention of informing busy data may be independently practiced, but are preferably combined. In this case, data may be informed with or without distinguishing the absent and busy states. Also, data may be managed with or without distinguishing the absent and busy states. When the absent and busy states are distinguished from each other, the duration of the time period charged until the next dialing in the absent state can be set to be longer than that in the busy state.

In the above description, data sent from the customer data informing section 215(1) is held in the customer data receiving section 216(2). Alternatively, the contents of the data may be recorded and managed in the call list. When data such as absence data of a customer detected in the own call center is to be recorded in the call list, the column of absence data of the customer of interest in the call list is also checked prior to dialing to the customer.

In the above description, linking of the two call centers has been exemplified. Three or more call centers can link. In this case, a certain call center may send data about all customers to other call centers, or each call may hold a correspondence table that describes the correspondence between customers and one or a plurality of other call centers to which data of the customers are to be sent, and may sent the absent or busy data of a certain customer to only the corresponding call center in the correspondence table. When a call center at the data receiving side receives data about an identical customer from a plurality of call centers, it preferably holds the latest data and invalidates data obtained so far.

Note that two or more call centers may be connected via special lines, public lines, or radio lines.

In the above arrangement, after call center 1 informs another call center of absence or busy data of a certain customer D, when it redials to the customer D and the connection is successful in turn, call center 1 may inform the other call center to which the data of the customer D was sent of presence data of the customer D.

Upon receiving the presence data of the customer D, the other call center at the data receiving side invalidates the absence data of the customer D, and can dial to the customer D before an elapse of the predetermined period of time, e.g., immediately.

In this case, in addition to the arrangement of the host computer 201 in each call center shown in FIG. 20, a function of detecting that a customer corresponding to absent or busy data managed in the call list 211 and/or customer data receiving section 216 is present on the basis of a response to redialing from the telephone dialing section 213, a function of informing all the data receiving sections 216 in other call centers, to which the absence data or the like of the customer was sent, of data indicating that the customer is present, and a function of invalidating the absence data or the like of the customer whose presence data is received (or after the predetermined period of time has elapsed), may be arranged.

As described above, since a plurality of call centers inform each other of absence or busy data of a certain customer, a call to an absent or busy customer can be prevented from being originated, thus improving the operator efficiency.

The present invention is not limited to the above-mentioned embodiments, and various modifications may be made within its technical scope.

For example, in each of the above embodiments, the telephones and terminals are separately arranged. Alternatively, the terminal itself may have a telephone function. More specifically, the terminal may have the telephone function by connecting a known speakerphone codec comprising a filter circuit, a D/A converter, an A/D converter, and the like to a system bus, and connecting a microphone and a loudspeaker to the speakerphone codec.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A method of pacing a call in a call origination management system having a plurality of operators to which answered calls are connected, comprising the steps of:

detecting a service completion timing in advance by detecting execution of a specific portion of a program which runs on a terminal operated by the operator thereby to generate a completion prediction signal;

registering the operator corresponding to the completion prediction signal in a completion prediction queue;

computing the number of calls to be originated based on the sum of the number of free operators and the number of operators registered in the completion prediction queue; and automatically originating a call based on the computed number of calls to be originated.

* * * * *